United States Patent
Hu et al.

(10) Patent No.: US 9,980,329 B2
(45) Date of Patent: May 22, 2018

(54) LIGHT EMITTING DIODE (LED) TUBE LAMP

(71) Applicant: JIAXING SUPER LIGHTING ELECTRIC APPLIANCE CO., LTD, Jiaxing (CN)

(72) Inventors: Hechen Hu, Jiaxing (CN); Aiming Xiong, Jiaxing (CN)

(73) Assignee: Jiaxing Super Lighting Electric Appliance Co., Ltd., Jiaxing, Zhejiang (CN)

( * ) Notice: Subject to any disclaimer, the term of this patent is extended or adjusted under 35 U.S.C. 154(b) by 0 days. days.

(21) Appl. No.: 15/064,621

(22) Filed: Mar. 9, 2016

(65) Prior Publication Data

US 2016/0270163 A1    Sep. 15, 2016

Related U.S. Application Data

(63) Continuation-in-part of application No. 15/055,630, filed on Feb. 28, 2016, now Pat. No. 9,781,805.

(30) Foreign Application Priority Data

| Mar. 10, 2015 | (CN) | 2015 1 0104823 |
| Mar. 25, 2015 | (CN) | 2015 1 0133689 |
| Mar. 26, 2015 | (CN) | 2015 1 0134586 |
| Apr. 14, 2015 | (CN) | 2015 1 0173861 |
| Apr. 22, 2015 | (CN) | 2015 1 0193980 |
| May 19, 2015 | (CN) | 2015 1 0259151 |
| May 29, 2015 | (CN) | 2015 1 0284720 |
| Jun. 10, 2015 | (CN) | 2015 1 0315636 |
| Jun. 12, 2015 | (CN) | 2015 1 0324394 |

(Continued)

(51) Int. Cl.
 H05B 33/08    (2006.01)

(52) U.S. Cl.
 CPC ..... *H05B 33/0815* (2013.01); *H05B 33/0803* (2013.01); *Y02B 20/341* (2013.01)

(58) Field of Classification Search
 None
 See application file for complete search history.

(56) References Cited

U.S. PATENT DOCUMENTS

| 2008/0302476 A1 | 12/2008 | Bommi et al. |
| 2010/0201269 A1* | 8/2010 | Tzou ............... F21V 23/006 |
| | | 315/51 |

(Continued)

*Primary Examiner* — Jany Richardson
(74) *Attorney, Agent, or Firm* — Muir Patent Law, PLLC

(57) ABSTRACT

An LED tube lamp includes a lamp tube having two pins to receive an external driving signal; a rectifying circuit coupled to the two pins to rectify the external driving signal; a filtering circuit coupled to the rectifying circuit to filter rectified signal; and an LED lighting module coupled to the filtering circuit to receive the filtered signal to emit light. The LED lighting module further has a driving circuit and an LED module, the driving circuit includes a controller and a conversion circuit coupled to the filtering circuit to receive and convert filtered signal into driving signal to drive the LED module. The LED tub lamp further includes an over voltage protection circuit coupled to the filtering circuit for detecting the filtered signal, the over voltage protection circuit clamps the filtered signal when determining the filtered signal is higher than a defined over voltage protection value.

27 Claims, 30 Drawing Sheets

(30) Foreign Application Priority Data

| | | |
|---|---|---|
| Jun. 17, 2015 | (CN) | 2015 1 0338027 |
| Jun. 26, 2015 | (CN) | 2015 1 0372375 |
| Jun. 26, 2015 | (CN) | 2015 1 0373492 |
| Jul. 2, 2015 | (CN) | 2015 1 0391910 |
| Jul. 10, 2015 | (CN) | 2015 1 0406595 |
| Jul. 27, 2015 | (CN) | 2015 1 0448220 |
| Aug. 7, 2015 | (CN) | 2015 1 0482944 |
| Aug. 8, 2015 | (CN) | 2015 1 0483475 |
| Aug. 8, 2015 | (CN) | 2015 1 0486115 |
| Aug. 14, 2015 | (CN) | 2015 1 0499512 |
| Aug. 26, 2015 | (CN) | 2015 1 0530110 |
| Sep. 2, 2015 | (CN) | 2015 1 0555543 |
| Sep. 6, 2015 | (CN) | 2015 1 0557717 |
| Sep. 18, 2015 | (CN) | 2015 1 0595173 |
| Oct. 20, 2015 | (CN) | 2015 1 0680883 |
| Oct. 29, 2015 | (CN) | 2015 1 0724263 |
| Jan. 26, 2016 | (CN) | 2016 1 0050944 |
| Jan. 26, 2016 | (CN) | 2016 1 0051691 |

(56) References Cited

U.S. PATENT DOCUMENTS

| | | | |
|---|---|---|---|
| 2011/0084627 A1 | 4/2011 | Sloan et al. | |
| 2011/0175536 A1* | 7/2011 | Fujita | F21S 8/02 |
| | | | 315/185 R |
| 2016/0081147 A1* | 3/2016 | Guang | H05B 33/0803 |
| | | | 315/123 |

* cited by examiner

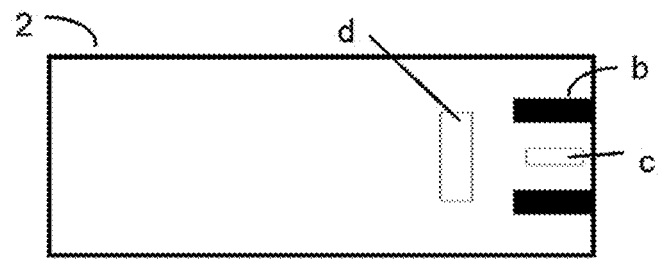
Fig. 19
 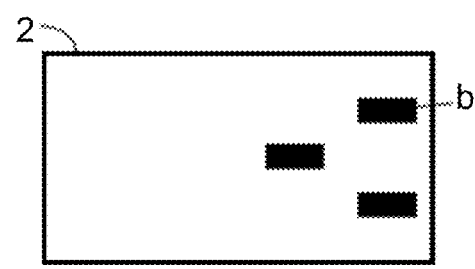
Fig. 20  Fig. 21
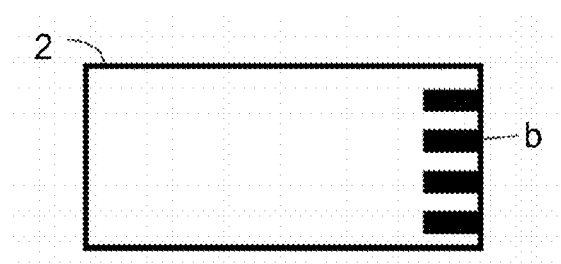 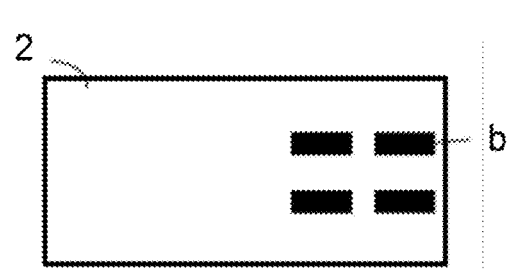
Fig. 22  Fig. 23
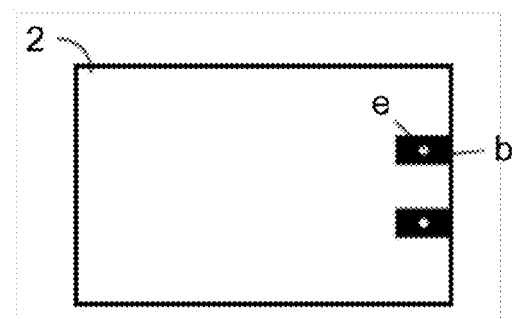
Fig. 24

LIGHT EMITTING DIODE (LED) TUBE
LAMP

RELATED APPLICATIONS

The present application is a continuation-in-part of U.S. Patent Application, filed Ser. No. 15/055,630, filed Feb. 28, 2016 in the United States Patent and Trademark Office, the entire contents of which is incorporated herein by reference, and which claims the benefit of priority under 35 U.S.C. § 119 to the following Chinese Patent Applications, filed with the State Intellectual Property Office (SIPO), the contents of each of which are incorporated herein by reference in their entirety: CN201510104823.3, filed Mar. 10, 2015; CN201510134586.5, filed Mar. 26, 2015; CN201510324394.0, filed Jun. 12, 2015; CN 201510133689.x, filed Mar. 25, 2015; CN201510173861.4, filed Apr. 14, 2015; CN201510193980.6, filed Apr. 22, 2015; CN201510284720.x, filed May 29, 2015; CN201510372375.5, filed Jun. 26, 2015; CN201510406595.5, filed Jul. 10, 2015; CN 201510482944.1, filed Aug. 7, 2015; CN201510483475.5, filed Aug. 8, 2015; CN 201510499512.1, filed Aug. 14, 2015; CN201510530110.3, filed Aug. 26, 2015; CN201510555543.4, filed Sep. 2, 2015; CN201510680883.X, filed Oct. 20, 2015; CN 201510724263.1, filed Oct. 29, 2015; CN 201510338027.6, filed Jun. 17, 2015; CN 201510315636.x, filed Jun. 10, 2015; CN 201510486115.0, filed Aug. 8, 2015; CN 201510557717.0, filed Sep. 6, 2015; CN 201510595173.7, filed Sep. 18, 2015; CN 201510259151.3, filed May 19, 2015; CN 201510373492.3, filed Jun. 26, 2015; CN 201510448220.5, filed Jul. 27, 2015; CN201610050944.9, filed Jan. 26, 2016; and CN 201610051691.7, filed, Jan. 26, 2016. This application also claims the benefit of priority under 35 U.S.C. § 119 to the following Chinese Patent Application, filed with the State Intellectual Property Office (SIPO), the contents of which are incorporated herein by reference in their entirety: CN 201510391910.1, filed Jul. 2, 2015.

TECHNICAL FIELD

The disclosed embodiments relate to the features of light emitting diode (LED) lighting. More particularly, the disclosed embodiments describe various improvements for LED tube lamps.

BACKGROUND

LED lighting technology is rapidly developing to replace traditional incandescent and fluorescent lightings. LED tube lamps are mercury-free in comparison with fluorescent tube lamps, which are filled with inert gas and mercury. Thus, LED tube lamps are becoming an illumination option among different available lighting systems used in homes and workplaces, which used to be dominated by traditional lighting options such as compact fluorescent light bulbs (CFLs) and fluorescent tube lamps. Benefits of LED tube lamps include improved durability and longevity and far less energy consumption; therefore, when taking into account all factors, they would typically be considered as a cost effective lighting option.

Typical LED tube lamps have a variety of LED elements and driving circuits. The LED elements include LED chip-packaging elements, light diffusion elements, high efficient heat dissipating elements, light reflective boards and light diffusing boards. Heat generated by the LED elements and the driving elements is considerable and mainly dominates the illumination intensity such that the heat dissipation is properly disposed to avoid rapid decrease of the luminance and the lifetime of the LED lamps. Thus, power loss, rapid light decay, and short lifetime due to poor heat dissipation tend to be the factors to be considered when improving the performance of the LED illuminating system.

Nowadays, most of the LED tube lamps use plastic tubes and metallic elements to dissipate heat from the LEDs. The metallic elements are usually exposed to the outside of the plastic tubes. This design improves heat dissipation but heightens the risk of electric shocks. The metallic elements may be disposed inside the plastic tubes; however, the heat still remains inside the plastic tubes and deforms the plastic tubes. Deformation of the plastic tubes also occurs even when the elements to dissipate heat from the LEDs are not metallic.

The metallic elements disposed to dissipate heat from the LEDs may be made of aluminum. However, aluminum is typically too soft to sufficiently support the plastic tubes when the deformation of plastic tubes occurs due to the heat as far as the metallic elements disposed inside the plastic tubes are concerned.

On the other hand, for some LED tube lamps, a rigid circuit board is typically electrically connected with end caps by way of wire bonding, in which the wires may be easily damaged or broken due to movement during manufacturing, transportation, and usage of the LED tube lamps and therefore may disable the LED tube lamps. Or, bendable circuit sheet may be used to electrically connect the LED assembly in the lamp tube and the power supply assembly in the end cap(s). Typically, the length of the lamp tube during manufacturing matches for the bendable circuit sheet, and thus the variable factor increases in the manufacture of the lamp tube.

In some embodiments, the heat generated by the LED tube lamp can be reduced through controlling the LED illumination and lighting period by an LED driving circuit. However, the LED may not meet the expected requirement based on some analog driving manners since the relationship between the LED illumination and the LED current is non-linear and color temperature of some LEDs changes according to LED current. Moreover, heat convection in the lamp tube is not easy performed. For example, in some cases, the lamp tube encompasses a confined space, and once the LED illumination increases, the lifespan of the LED tube lamp shortens because the lifespan of LEDs is sensitive to temperature. Also, some LED driving circuits result in the circuit bandwidth getting smaller since the driving voltage/current repeatedly returns between the maximum and minimum. This limits the minimum conducting period and affects the driving frequency.

As a result, traditional technologies may result in decreased heat conduction, poor heat dissipation, heat deformation, electric shock, weak electrical connection, smaller driving bandwidth, and variable factor in manufacture defects.

SUMMARY

Therefore, the disclosed embodiments may provide a significantly improved light emitting diode (LED) tube lamp that dissipates heat more efficiently. In addition, the disclosed embodiments may provide an LED tube lamp that is structurally stronger. Further, the disclosed embodiments may provide an LED tube lamp that minimizes the risk of electric shocks. Additionally, the disclosed embodiments may provide an LED tube lamp with efficiently driving circuits In accordance with certain exemplary embodiments, an LED tube lamp includes a lamp tube having two pins to receive an external driving signal; a rectifying circuit coupled to the two pins to rectify the external driving signal; a filtering circuit coupled to the rectifying circuit to filter the rectified signal; and an LED lighting module coupled to the filtering circuit to receive the filtered signal to emit light. The lamp tube further includes a light transmissive portion and a reinforcing portion. The reinforcing portion includes a platform and a bracing structure. The bracing structure includes a horizontal rib and a vertical rib and is fixedly connected to the platform. The rectifying circuit, the filtering circuit, and the LED lighting module are disposed on an upper surface of the platform so as to increase the heat dissipating area and efficiency.

In some embodiments, the rectifying circuit, the filtering circuit, and the LED lighting module include surface mount components so as to reduce circuit volume and increase the efficiency of heat dissipation.

In some embodiments, since the circuits mentioned above are disposed on the upper surface of the platform, the LED assembly in the lamp tube may be unnecessary to connect the power supply assembly in the end cap(s) (has been disposed on the platform) by way of wire bonding, so as to simplify the connection between the lamp tube and the end cap(s).

In some embodiments, since the circuits mentioned above are disposed on the upper surface of the platform, the LED assembly in the lamp tube may be unnecessary to connect the power supply assembly in the end cap(s) (has been disposed on the platform) by the bendable circuit sheet, so that the length of the lamp tube during manufacturing is unnecessary to take the bendable circuit sheet into consideration so as to reduce variable factor in manufacture of the lamp tube.

Various other objects, advantages and features will become readily apparent from the ensuing detailed description, and the features will be particularly pointed out in the appended claims.

BRIEF DESCRIPTION OF THE FIGURES

The following detailed descriptions, given by way of example, and not intended to limit the present disclosure thereto, will be best be understood in conjunction with the accompanying figures:

FIG. 19 is a planar view illustrating an arrangement of the soldering pads on the bendable circuit sheet of the LED light strip in accordance with an exemplary embodiment;

FIG. 20 is a planar view illustrating three soldering pads in a row on the bendable circuit sheet of the LED light strip in accordance with an exemplary embodiment;

FIG. 21 is a planar view illustrating soldering pads sitting in two rows on the bendable circuit sheet of the LED light strip in accordance with an exemplary embodiment;

FIG. 22 is a planar view illustrating four soldering pads sitting in a row on the bendable circuit sheet of the LED light strip in accordance with an exemplary embodiment;

FIG. 23 is a planar view illustrating soldering pads sitting in a two by two matrix on the bendable circuit sheet of the LED light strip in accordance with an exemplary embodiment;

FIG. 24 is a planar view illustrating through holes formed on the soldering pads in accordance with an exemplary embodiment;

DETAILED DESCRIPTION OF THE EMBODIMENTS

Figure 1:
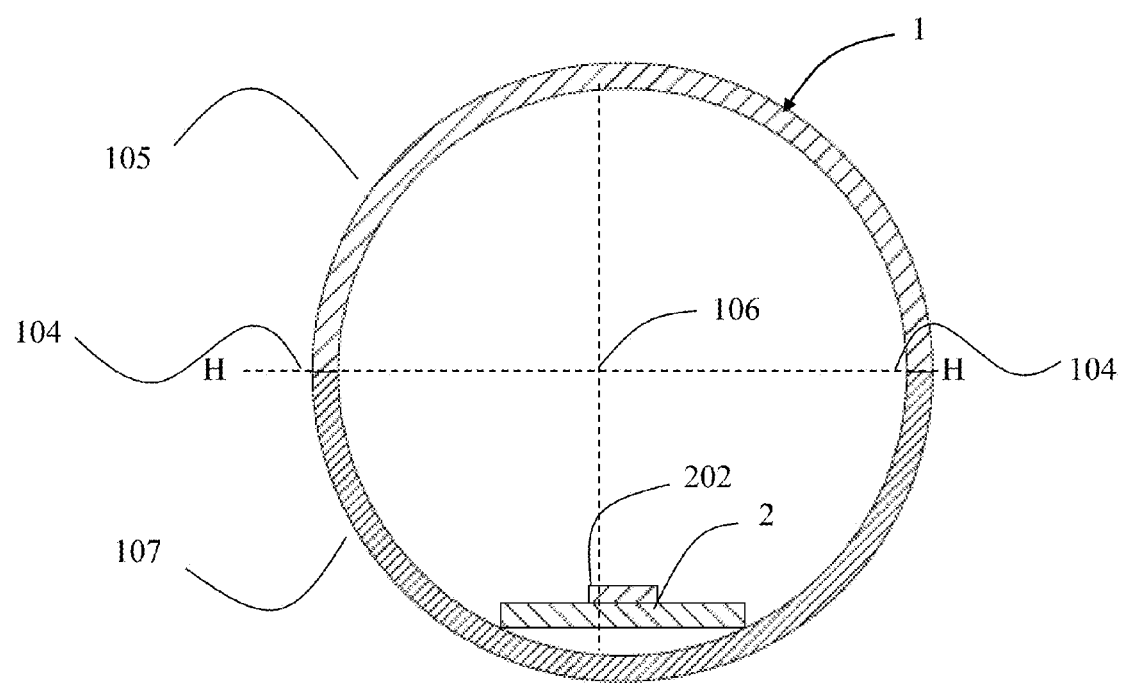
FIG. 1 is a cross-sectional view of the light emitting diode (LED) tube lamp with a light transmissive portion and a reinforcing portion in accordance with an exemplary embodiment.

The present disclosure now will be described more fully hereinafter with reference to the accompanying drawings, in which various embodiments are shown. The invention may, however, be embodied in many different forms and should not be construed as limited to the example embodiments set forth herein. These example embodiments are just that—examples—and many implementations and variations are possible that do not require the details provided herein. It should also be emphasized that the disclosure provides details of alternative examples, but such listing of alternatives is not exhaustive. Furthermore, any consistency of detail between various examples should not be interpreted as requiring such detail—it is impracticable to list every possible variation for every feature described herein. The language of the claims should be referenced in determining the scope of the invention.

In the drawings, the size and relative sizes of layers and regions may be exaggerated for clarity. Like numbers refer to like elements throughout. Though the different figures show variations of exemplary embodiments, these figures are not necessarily intended to be mutually exclusive from each other. Rather, as will be seen from the context of the detailed description below, certain features depicted and described in different figures can be combined with other features from other figures to result in various embodiments, when taking the figures and their description as a whole.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "and/or" includes any and all combinations of one or more of the associated listed items and may be abbreviated as "/". As used herein, the term "and/or" includes any and all combinations of one or more of the associated listed items. Also, the term "exemplary" is intended to refer to an example or illustration.

Although the figures described herein may be referred to using language such as "one embodiment," or "certain embodiments," these figures, and their corresponding descriptions are not intended to be mutually exclusive from other figures or descriptions, unless the context so indicates. Therefore, certain aspects from certain figures may be the same as certain features in other figures, and/or certain figures may be different representations or different portions of a particular exemplary embodiment.

It will be understood that, although the terms first, second, third etc. may be used herein to describe various elements, components, regions, layers and/or sections, these elements, components, regions, layers and/or sections should not be limited by these terms. Unless the context indicates otherwise, these terms are only used to distinguish one element, component, region, layer or section from another element, component, region, layer or section, for example as a naming convention. Thus, a first element, component, region, layer or section discussed below in one section of the specification could be termed a second element, component, region, layer or section in another section of the specification or in the claims without departing from the teachings of the present disclosure. In addition, in certain cases, even if a term is not described using "first," "second," etc., in the specification, it may still be referred to as "first" or "second" in a claim in order to distinguish different claimed elements from each other.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that when an element is referred to as being "connected" or "coupled" to, "in contact with," or "on" another element, it can be directly connected or coupled to, in contact with, or on the other element or intervening elements may be present. In contrast, when an element is referred to as being "directly connected," "directly coupled," in "direct contact with," or "directly on" to another element, there are no intervening elements present. Other words used to describe the relationship between elements should be interpreted in a like fashion (e.g., "between" versus "directly between," "adjacent" versus "directly adjacent," etc.). However, the term "contact," as used herein refers to direct contact (i.e., touching) unless the context indicates otherwise.

Embodiments described herein will be described referring to plan views and/or cross-sectional views by way of ideal schematic views. Accordingly, the exemplary views may be modified depending on manufacturing technologies and/or tolerances. Therefore, the disclosed embodiments are not limited to those shown in the views, but include modifications in configuration formed on the basis of manufacturing processes. Therefore, regions exemplified in figures may have schematic properties, and shapes of regions shown in figures may exemplify specific shapes of regions of elements to which aspects of the disclosure are not limited.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

Spatially relative terms, such as "beneath," "below," "lower," "above," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

Terms such as "same," "planar," or "coplanar," as used herein when referring to orientation, layout, location, shapes, sizes, amounts, or other measures do not necessarily mean an exactly identical orientation, layout, location, shape, size, amount, or other measure, but are intended to encompass nearly identical orientation, layout, location, shapes, sizes, amounts, or other measures within acceptable variations that may occur, for example, due to manufacturing processes. The term "substantially" may be used herein to reflect this meaning.

As used herein, items described as being "electrically connected" are configured such that an electrical signal can be passed from one item to the other. Therefore, a passive electrically conductive component (e.g., a wire, pad, internal electrical line, etc.) physically connected to a passive electrically insulative component (e.g., a prepreg layer of a printed circuit board, an electrically insulative adhesive connecting two devices, an electrically insulative underfill or mold layer, etc.) is not electrically connected to that component. Moreover, items that are "directly electrically connected," to each other are electrically connected through one or more passive elements, such as, for example, wires, pads, internal electrical lines, through vias, etc. As such, directly electrically connected components do not include components electrically connected through active elements, such as transistors or diodes.

Components described as thermally connected or in thermal communication are arranged such that heat will follow a path between the components to allow the heat to transfer from the first component to the second component. Simply because two components are part of the same device or package does not make them thermally connected. In general, components which are heat-conductive and directly connected to other heat-conductive or heat-generating components (or connected to those components through intermediate heat-conductive components or in such close proximity as to permit a substantial transfer of heat) will be described as thermally connected to those components, or in thermal communication with those components. On the contrary, two components with heat-insulative materials therebetween, which materials may prevent heat transfer between the two components, or only allow for incidental heat transfer, are not described as thermally connected or in thermal communication with each other. The terms "heat-conductive" or "thermally-conductive" do not apply to a particular material simply because it provides incidental heat conduction, but are intended to refer to materials that are typically known as good heat conductors or known to have utility for transferring heat, or components having similar heat conducting properties as those materials.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein. In addition, unless the context indicates otherwise, steps described in a particular order need not occur in that order.

Referring to FIG. 1, in accordance with an exemplary embodiment, the LED tube lamp comprises a lamp tube 1 and an LED light assembly. The lamp tube 1 includes a light transmissive portion 105 and a reinforcing portion 107. The reinforcing portion 107 is fixedly connected to the light transmissive portion 105.

The LED light assembly is disposed inside the lamp tube 1 and includes an LED light source 202 and an LED light strip 2. The LED light source is thermally and electrically connected to the LED light strip 2, which is in turn thermally connected to the reinforcing portion 107. Heat generated by the LED light source 202 is first transmitted to the LED light strip 2 and then to the reinforcing portion 107 before egressing the lamp tube 1. Thermal connection is achieved with thermally conductive tapes or conventional mechanical fasteners such as screws aided by thermal grease to eliminate air gaps from interface areas.

Typically, the lamp tube 1 has a shape of an elongated cylinder, which is a straight structure. However, the lamp tube 1 can take any curved structure such as a ring or a horseshoe. The cross section of the lamp tube 1 defines, typically, a circle, or not as typically, an ellipse or a polygon. Alternatively, the cross section of the lamp tube 1 takes an irregular shape depending on the shapes of, respectively, the light transmissive portion 105 and the reinforcing portion 107 and on the manner the two portions interconnect to form the lamp tube 1.

The lamp tube 1 is a glass tube, a plastic tube or a tube made of any other suitable material or combination of materials. A plastic lamp tube is made from light transmissive plastic, thermally conductive plastic or a combination of both. The light transmissive plastic is one of translucent polymer matrices such as polymethyl methacrylate, polycarbonate, polystyrene, poly(styrene-co-methyl methacrylate) and a mixture thereof. Optionally, the strength and elasticity of thermally conductive plastic is enhanced by bonding a plastic matrix with glass fibers. When a lamp tube employs a combination of light transmissive plastic and thermally conductive plastic, does in the combination. In an embodiment, an outer shell of lamp tube includes a plurality of layers made from distinct materials. For example, the lamp tube includes a plastic tube coaxially sheathed by a glass tube.

In an embodiment, the light transmissive portion 105 is made from light transmissive plastic. The reinforcing portion is 107 made from thermally conductive plastic. Injection molding is used for producing the light transmissive portion 105 in a first piece and for producing the reinforcing portion 107 in a separate second piece. The first piece and the second piece are configured to be clipped together, buckled together, glued together or otherwise fixedly interconnect to form the lamp tube 1. Alternatively, injection molding is used for producing the lamp tube 1, which includes the light transmissive portion 105 and the reinforcing portion 107, in an integral piece by feeding two types of plastic materials into a molding process. In an alternative embodiment, the reinforcing portion is made of metal having good thermal conductivity such as aluminum alloy and copper alloy.

Respective shapes of the light transmissive portion 105 and the reinforcing portion 107, how the two portions 105, 107 interconnect to form the lamp tube 1 and the respective proportions of the two portions 105, 107 in the lamp tube depend on one or more considerations, such as, for example, field angle, heat dissipation efficiency and structural strength. A wider field angle—potentially at the expense of heat dissipation capability and structural strength—is achieved when the proportion of the light transmissive portion increases 105 in relation to that of the reinforcing portion 107. By contrast, the lamp tube benefits from an increased proportion of the reinforcing portion 107 in relation to that of the light transmissive portion in such ways as better heat dissipation and rigidity but potentially loses field angle.

In some embodiments, the reinforcing portion 107 includes a plurality of protruding parts. In other embodiments, a plurality of protruding parts are disposed on the surface of the LED light strip 2 that is not covered by the LED light assembly. Like fins on a heatsink, the protruding part boosts heat dissipation by increasing the surface area of the reinforcing portion 107 and the LED light strip 2. The protruding parts are disposed equidistantly, or alternatively, not equidistantly.

Staying on FIG. 1, the lamp tube 1 has a shape of a circular cylinder. Thus, a cross section of the lamp tube 1 defines a hypothetical circle. A line H-H cuts the circle horizontally into two equal halves along a diameter of the circle. A cross section of the light transmissive portion 105 defines an upper segment on the circle. A cross section of the reinforcing portion 107 defines a lower segment on the circle. A dividing line 104 parallel to the line H-H is shared by the two segments. In the embodiment, the dividing line 104 sits exactly on the line H-H. Consequently, the area of the upper segment is the same as that of the lower segment. For example, the cross section of the light transmissive portion 105 has a same area as that of the reinforcing portion 107.

In an alternative embodiment, the dividing line 104 is spaced apart from the line H-H. For example, when the dividing line 104 is below the line H-H, the upper segment, which encompasses the light transmissive portion, has a greater area than the lower segment, which encompasses the reinforcing portion. The lamp tube, which includes an enlarged light transmissive portion, is thus configured to achieve a field angle wider than 180 degrees; however, other things equal, the lamp tube surrenders some heat dissipation capability, structural strength or both due to a diminished reinforcing portion 107. By contrast, the lamp tube 1 has an enlarged reinforcing portion 107 and a diminished light transmissive portion 105 if the dividing line rises above the line H-H. Other things equal, the lamp tube 1, now having an enlarged reinforcing portion 107, is configured to exhibit higher heat dissipation capability, structural strength or both; however, the field angle of the lamp tube 1 will dwindle due to diminished dimensions of the light transmissive portion 105.

The LED tube lamp is configured to convert bright spots coming from the LED light source into an evenly distributed luminous output. In an embodiment, a light diffusion layer is disposed on an inner surface of the lamp tube 1 or an outer surface of the lamp tube 1. In another embodiment, a diffusion laminate is disposed over the LED light source 202. In yet another embodiment, the lamp tube 1 has a glossy outer surface and a frosted inner surface. The inner surface is rougher than the outer surface. The roughness $R_a$ of the inner surface may be from 0.1 to 40 μm. In some embodiments, the roughness $R_a$ of the inner surface may be from 1 to 20 μm. Controlled roughness of the surface is obtained mechanically by a cutter grinding against a workpiece, deformation on a surface of a workpiece being cut off or high frequency vibration in the manufacturing system. Alternatively, roughness is obtained chemically by etching a surface. Depending on the luminous effect the lamp tube 1 is designed to produce, a suitable combination of amplitude and frequency of a roughened surface is provided by a matching combination of workpiece and finishing technique.

In alternative embodiment, the diffusion layer is in form of an optical diffusion coating, which is composed of any one of calcium carbonate, halogen calcium phosphate and aluminum oxide, or any combination thereof. When the optical diffusion coating is made from a calcium carbonate with suitable solution, an excellent light diffusion effect and transmittance to exceed 90% can be obtained.

In alternative embodiment, the diffusion layer is in form of an optical diffusion coating, which is composed of any one of calcium carbonate, halogen calcium phosphate and aluminum oxide, or any combination thereof. When the optical diffusion coating is made from a calcium carbonate with suitable solution, an excellent light diffusion effect and transmittance to exceed 90% can be obtained.

In the embodiment, the composition of the diffusion layer in form of the optical diffusion coating includes calcium carbonate, strontium phosphate (e.g., CMS-5000, white powder), thickener, and a ceramic activated carbon (e.g., ceramic activated carbon SW-C, which is a colorless liquid). Specifically, such an optical diffusion coating on the inner circumferential surface of the glass tube has an average thickness ranging between about 20 to about 30 μm. A light transmittance of the diffusion layer using this optical diffusion coating is about 90%. Generally speaking, the light transmittance of the diffusion layer ranges from 85% to 96%. In addition, this diffusion layer can also provide electrical isolation for reducing risk of electric shock to a user upon breakage of the lamp tube 1. Furthermore, the diffusion layer provides an improved illumination distribution uniformity of the light outputted by the LED light sources 202 such that the light can illuminate the back of the light sources 202 and the side edges of the bendable circuit sheet so as to avoid the formation of dark regions inside the lamp tube 1 and improve the illumination comfort. In another possible embodiment, the light transmittance of the diffusion layer can be 92% to 94% while the thickness ranges from about 200 to about 300 μm.

In another embodiment, the optical diffusion coating can also be made of a mixture including calcium carbonate-based substance, some reflective substances like strontium phosphate or barium sulfate, a thickening agent, ceramic activated carbon, and deionized water. The mixture is coated on the inner circumferential surface of the glass tube and has an average thickness ranging between about 20 to about 30 μm. In view of the diffusion phenomena in microscopic terms, light is reflected by particles. The particle size of the reflective substance such as strontium phosphate or barium sulfate will be much larger than the particle size of the calcium carbonate. Therefore, adding a small amount of reflective substance in the optical diffusion coating can effectively increase the diffusion effect of light.

In other embodiments, halogen calcium phosphate or aluminum oxide can also serve as the main material for forming the diffusion layer. The particle size of the calcium carbonate is about 2 to 4 μm, while the particle size of the halogen calcium phosphate and aluminum oxide are about 4 to 6 μm and 1 to 2 μm, respectively. When the light transmittance is to be 85% to 92%, the average thickness for the optical diffusion coating mainly having the calcium carbonate is about 20 to about 30 μm, while the average thickness for the optical diffusion coating mainly having the halogen calcium phosphate may be about 25 to about 35 μm, and the average thickness for the optical diffusion coating mainly having the aluminum oxide may be about 10 to about 15 μm. However, when the required light transmittance is up to 92% or higher, the optical diffusion coating mainly having the calcium carbonate, the halogen calcium phosphate, or the aluminum oxide is thinner.

The main material and the corresponding thickness of the optical diffusion coating can be decided according to the place for which the lamp tube 1 is used and the desired light transmittance. It may be that the higher the light transmittance of the desired diffusion layer, the more apparent the grainy visual appearance of the light sources may be.

In an embodiment, the LED tube lamp is configured to reduce internal reflectance by applying a layer of anti-reflection coating to an inner surface of the lamp tube 1. The coating has an upper boundary, which divides the inner surface of the lamp tube and the anti-reflection coating, and a lower boundary, which divides the anti-reflection coating and the air in the lamp tube 1. Light waves reflected by the upper and lower boundaries of the coating interfere with one another to reduce reflectance. The coating is made from a material with a refractive index of a square root of the refractive index of the light transmissive portion 105 of the lamp tube 1 by vacuum deposition. Tolerance of the coating's refractive index is ±20%. The thickness of the coating is chosen to produce destructive interference in the light reflected from the interfaces and constructive interference in the corresponding transmitted light. In an improved embodiment, reflectance is further reduced by using alternating layers of a low-index coating and a higher-index coating. The multi-layer structure is designed to, when setting parameters such as combination and permutation of layers, thickness of a layer, refractive index of the material, give low reflectivity over a broad band that covers at least 60% of the wavelength range beaming from the LED light source 202. In some embodiments, multi-layer structure may be designed to give low reflectivity over a broad band that covers at least 80% of the wavelength range beaming from the LED light source 202. In some embodiments, three successive layers of anti-reflection coatings are applied to an inner surface of the lamp tube 1 to obtain low reflectivity over a wide range of frequencies. The thicknesses of the coatings are chosen to give the coatings optical depths of, respectively, one half, one quarter and one half of the wavelength range coming from the LED light source 202. Dimensional tolerance for the thickness of the coating is set at ±20%.

Figure 2:
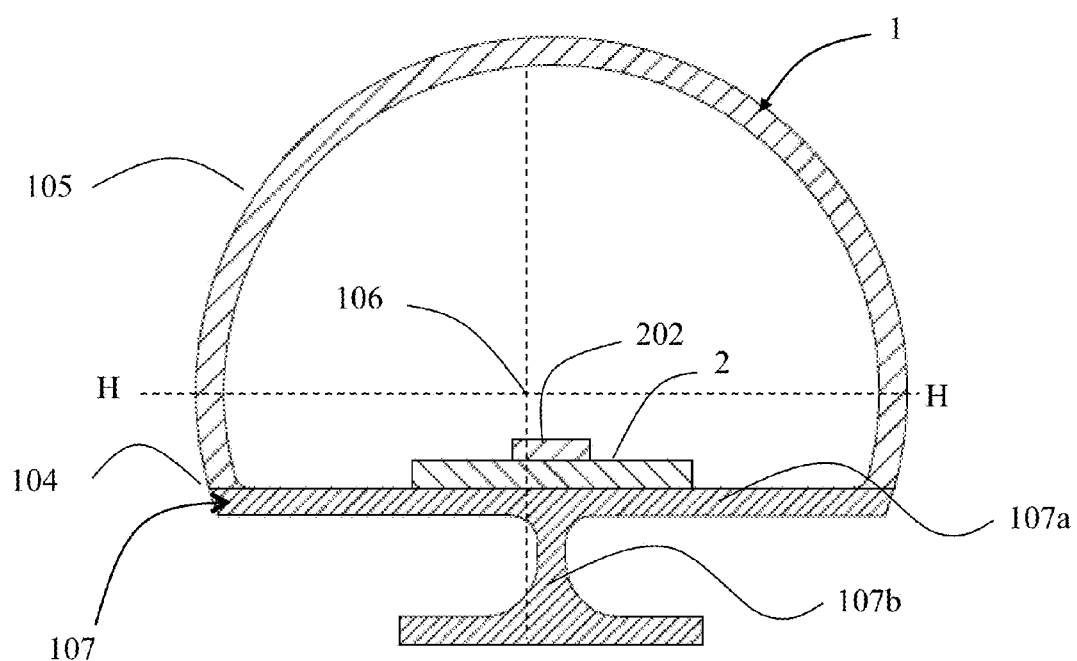
FIG. 2 is a cross-sectional view of the LED tube lamp with a bracing structure in accordance with an exemplary embodiment.

Turning to FIG. 2, in accordance with an exemplary embodiment, the cross section of the lamp tube 1, unlike that of the cylindrical lamp tube 1 in FIG. 1, approximates an arc sitting on a flange of an I-beam. The lamp tube 1 includes a light transmissive portion 105 and a reinforcing portion 107. A cross section of the light transmissive portion 105 defines an upper segment on a hypothetical circle. A line H-H cuts the circle horizontally into two equal halves along a diameter of the circle. The reinforcing portion 107 includes a platform 107a and a bracing structure 107b. The platform 107a has an upper surface and a lower surface. The LED light assembly is disposed on the upper surface of the platform 107a. The bracing structure 107b is fixedly connected to the platform 107a and holds the platform 107a in place. The bracing structure 107b includes a horizontal rib, a vertical rib, a curvilinear rib or a combination of ribs selected from the above. The dimensions of the platform 107a, the horizontal rib and the vertical rib, their quantities and the manner they interconnect depend on one or more considerations, such as, for example, field angle, heat dissipation efficiency and structural strength. In the embodiment, the cross section of the reinforcing portion 107 approximates that of an I-beam. The platform 107a, the vertical rib and the horizontal rib correspond to, respectively, the upper flange, the web and the bottom flange of the I-beam. For example, the bracing structure 107b includes exactly one vertical rib and exactly one horizontal rib.

A dividing line 104 parallel to the line H-H is shared by the upper segment and the upper flange. In the embodiment, the dividing line sits below the line H-H. Consequently, the upper segment constitutes the majority of the hypothetical circle. The light transmissive portion 105 is thus configured to generate a field angle wider than 180 degrees. In an alternative embodiment, the dividing line sits on or above the line H-H. For example, when the dividing line rises above the line H-H, the upper segment, which encompasses the light transmissive portion, now constitutes less than half of the hypothetical circle. The lamp tube 1, which has an enlarged reinforcing portion 107, is thus configured for better heat dissipation and structural strength; however, other things equal, the lamp tube 1 loses some luminous filed due to a diminished light transmissive portion 105.

In an embodiment, a surface on which the LED light assembly sits—e.g. the upper surface of the platform—is configured to further reflect the light reflected from the inner surface of the lamp tube 1. The surface on which the LED light assembly sits is coated with a reflective layer. Alternatively, the surface is finished to exhibit a reflectance of 80 to 95%. In some embodiments, the surface is finished to exhibit a reflectance of 85 to 90%. Finishing is performed mechanically, chemically or by fluid jet. Mechanical finishing buffs a surface by removing peaks from the surface with an abrasive stick, a wool polishing wheel or a sandpaper. A surface treated this way has a roughness $R_a$ as low as 0.008 to 1 µm. Chemical finishing works by dissolving peaks of a surface faster than troughs of the surface with a chemical agent. Fluid jet finishing uses a high-speed stream of slurry to accurately remove nanometers of material from a surface. The slurry is prepared by adding particles such as silicon carbide powder to a fluid capable of being pumped under relatively low pressure.

Figure 3:
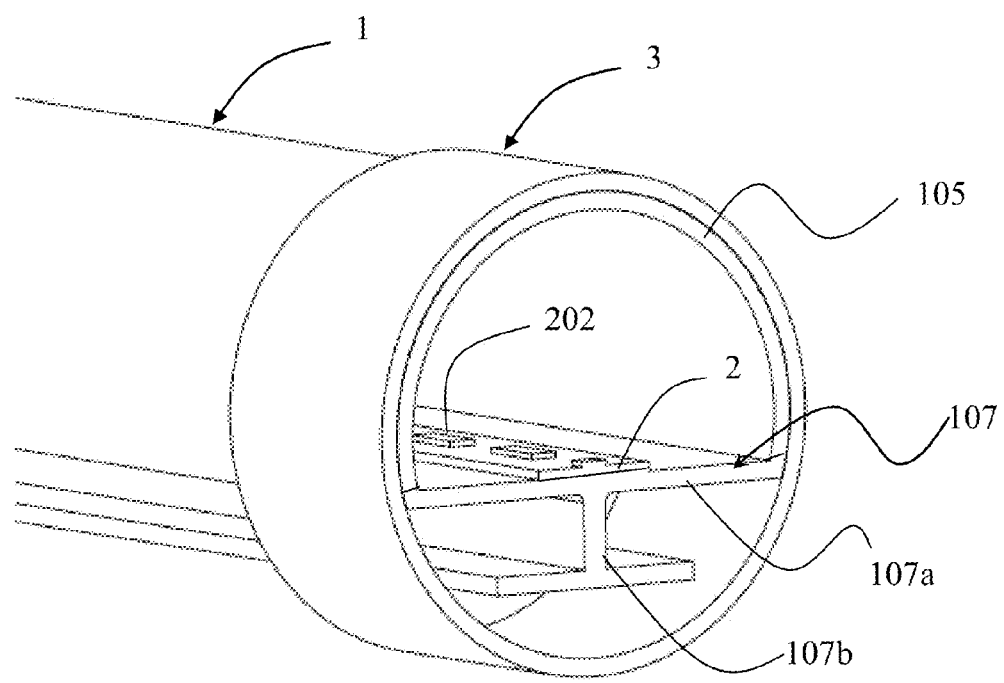
FIG. 3 is a perspective view of the LED tube lamp schematically illustrating the bracing structure shown in FIG. 2.

Turning to FIG. 3, in accordance with an exemplary embodiment, the LED tube lamp further comprises an end cap 3, which is fixedly connected to an end of the lamp tube 1. The end cap 3 is made from plastic, metal or a combination of both. The end cap 3 and the lamp tube 1 are latched together, buckled together or otherwise mechanically fastened to one another. Alternatively, the two parts are glued together with hot-melt adhesive, e.g. a silicone matrix with a thermal conductivity of at least 0.7 $Wm^{-1}K^{-1}$.

Typically, the end cap 3 has a shape of a cylinder. The cross section of the end cap 3 thus defines a circle. Alternatively, the cross section of the end cap 3 takes an irregular shape depending on the shapes of, respectively, the light transmissive portion and the reinforcing portion and on the manner the two portions and the end cap 3 interconnect to form the LED tube lamp. Regardless of the shape of the end cap 3, the cross section of the end cap 3 encloses all or only a part of the cross section of the reinforcing portion 107 of the lamp tube 1. In the embodiment shown in FIG. 3, the end cap 3 defines a circular cylinder whose cross section encloses, entirely, the cross sections of, respectively, the light transmissive portion 105 and the reinforcing portion 107. The cross section of the lamp tube 1 approximates a segment, defined by the light transmissive portion 105, sitting on an upper flange of a hypothetical I-beam, defined by the reinforcing portion 107. A cross section of an inner surface of the end cap 3 defines a hypothetical circle. The hypothetical circle shares a same arc of the hypothetical segment defined by an outer surface of the light transmissive portion 105. The I-beam is enclosed, entirely, by the hypothetical circle.

Figure 4:
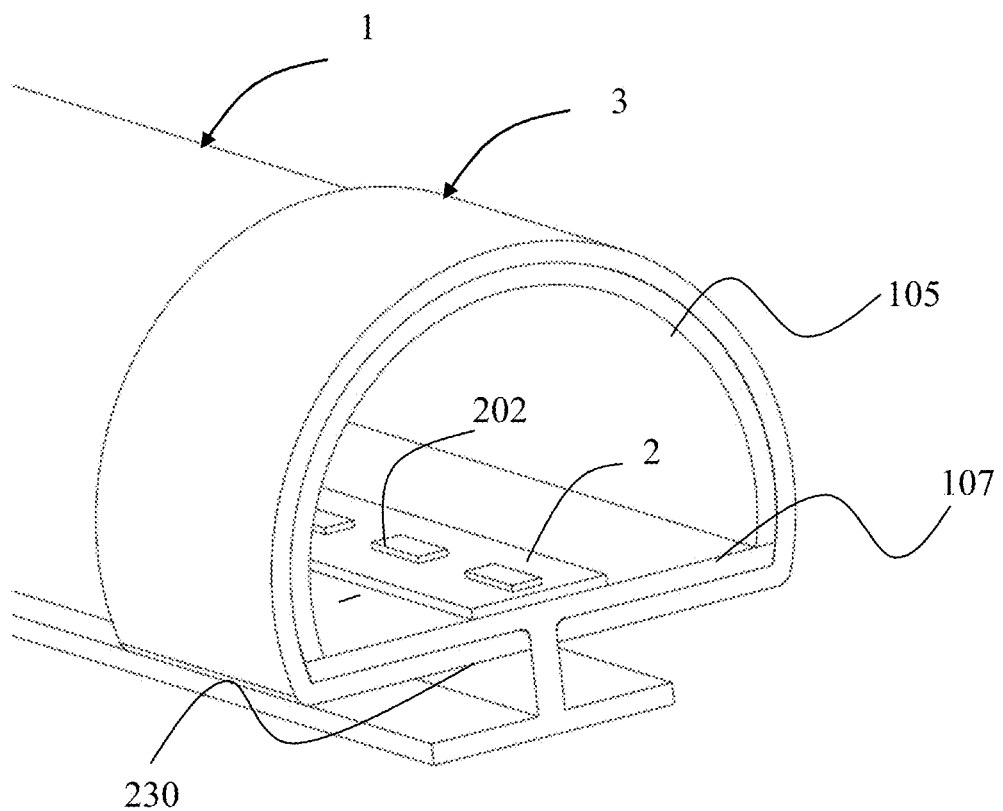
FIG. 4 is a perspective view of the LED tube lamp with a non-circular end cap in accordance with an exemplary embodiment.

In an alternative embodiment shown in FIG. 4, the cross section of the end cap 3 encloses all of the cross section of the light transmissive portion 105 but only a part of that of the reinforcing portion 107. A cross section of the inner surface of the end cap 3 defines a same hypothetical segment defined by an outer surface of the light transmissive portion 105. However, the upper flange of the hypothetical I-beam is enclosed by the hypothetical segment, but the lower flange and the web are not.

In some embodiments, an end of the LED light assembly extends to the end cap 3 as shown in FIGS. 3 and 4. In other embodiments, an end of the LED light assembly recedes from the end cap 3.

The bracing structure 107b may be made of metal or plastic. The metal may be pure metal, metal alloy or combination of pure metal and metal alloy with different stiffness. Similarly, the plastic may include materials with various stiffness. Specifically, the plastic lamp tube 1 may include only one bracing structure with one stiffness or two bracing structures with various stiffness.

When only one bracing structure is adopted, the material of the one bracing structure may be metal, metal alloy, or plastic, and the ratio of the cross-sectional area of the bracing structure to the cross-sectional area of the lamp tube 1 is from 1:3 to 1:30. In some embodiments, the ratio of the cross-sectional area of the bracing structure to the cross-sectional area of the lamp tube 1 may be from 1:5 to 1:10.

When more than one bracing structures with different stiffness are adopted, each of the bracing structures may be made of metal, metal alloy, or plastic. In one embodiment, when two bracing structures with different stiffness are adopted, the ratio of the cross-sectional area of the bracing structure with larger stiffness to the cross-sectional area of the other bracing structure is from 0.001:1 to 100:1, and the ratio of the cross-sectional area of the bracing structure with larger stiffness to the cross-sectional area of the lamp tube 1 is from 1:20 to 1:300.

In view of the bracing structure made of metal, the cross-section of the lamp tube 1 vertically cut by a hypothetical plane shows that the hypothetical plane may include the following 1. a lamp tube made of plastic, a first bracing structure made of a metal with a first stiffness, and a second bracing structure, such as a maintaining stick, made of a metal with a second stiffness different from the first stiffness; 2. a lamp tube made of plastic and a single bracing structure made of metal and/or metal alloy; or 3. a lamp tube made of plastic, a first bracing structure made of metal, and a second bracing structure, such as a maintaining stick, made of metal alloy. Similarly, various plastics with different stiffness may be used to serve as the bracing structures mentioned above according to certain exemplary embodiments. As long as the materials for the used bracing structures have different stiffness, the materials are not limited. Thus, metal or metal alloy and plastic could also be served as materials for different bracing structures. Additionally, the bracing structure is made from a material having a greater stiffness than the material from which the lamp tube is made.

In some embodiments, the lamp tube includes a first end cap fixedly connecting to a first end of the lamp tube and a second end cap fixedly connecting to a second end of the lamp tube. The first end cap is dimensionally larger—e.g. from 20% to 70% larger—than the second end cap.

Figure 5:
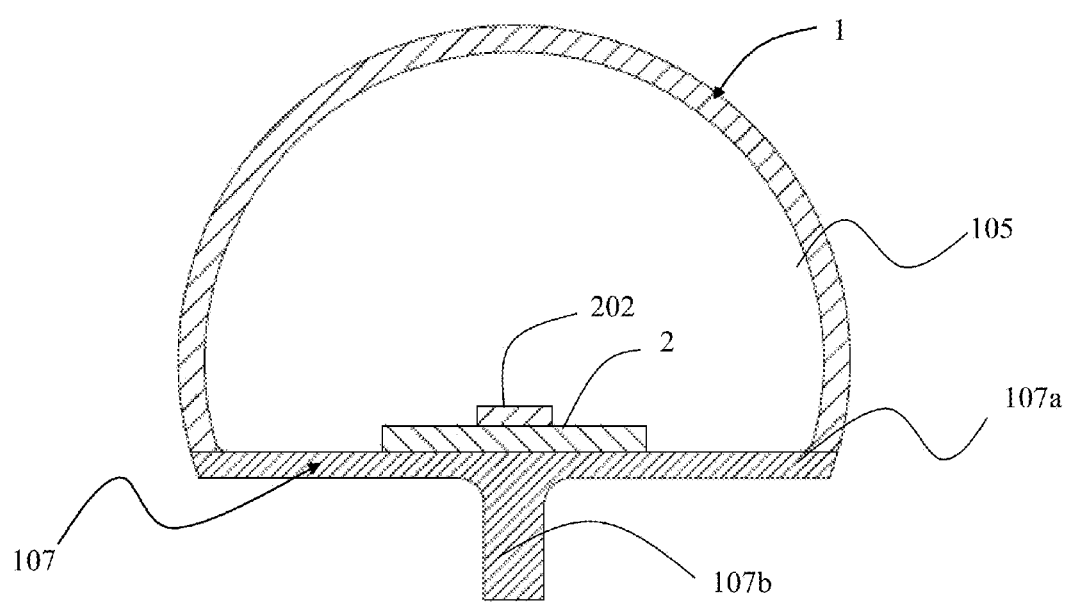
FIG. 5 is a cross-sectional view illustrating a vertical rib of the lamp tube in accordance with an exemplary embodiment.

Shifting to FIG. 5, in accordance with an exemplary embodiment, the cross section of the lamp tube 1 approximates an arc sitting on a flange of a hypothetical T-beam. The cross section of the reinforcing portion 107 approximates that of the T-beam. The platform 107a and the vertical rib correspond to, respectively, the flange and the web of the T-beam. For example, the bracing structure 107b includes exactly one vertical rib but no horizontal rib. When the cross section of the end cap 3 encloses, entirely, the cross sections of, respectively, the light transmissive portion 105 and the reinforcing portion 107, other things equal, the vertical rib in a T-beam structure (FIG. 5) has a greater length than the vertical rib in an I-beam structure (FIG. 3).

Figure 6:
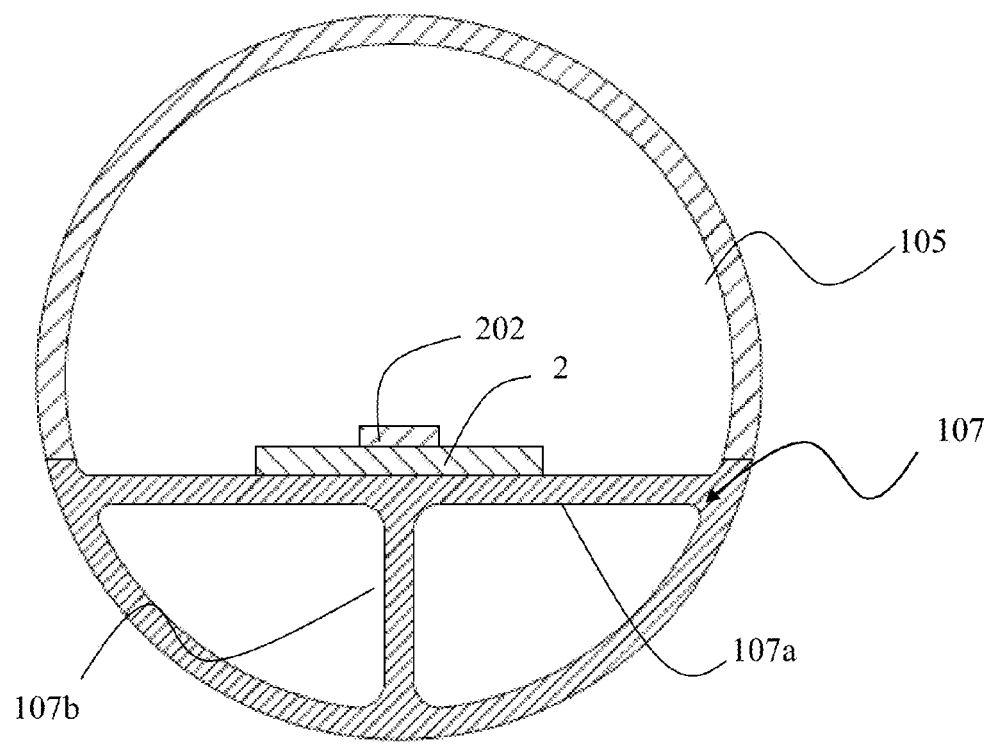
FIG. 6 is a cross-sectional view illustrating the bracing structure of the lamp tube in accordance with an exemplary embodiment.

Turning to FIG. 6, in accordance with an exemplary embodiment, the bracing structure 107b includes a vertical rib and a curvilinear rib but no horizontal rib. The cross section of the lamp tube 1 defines a hypothetical circle. A cross section of the light transmissive portion 105 defines an upper arc on the circle. A cross section of the curvilinear rib defines a lower arc on the circle. A cross section of the platform 107a and the vertical rib approximates that of a hypothetical T-beam. All three ends of the T-beam sit on the lower arc. The ratio of the length of the vertical rib to the diameter of the lamp tube 1 depends on one or more considerations, such as, for example, field angle, heatsinking efficiency and structural strength. In some embodiments, the ratio is from 1:1.2 to 1:30. In still other embodiments, the ratio is from 1:3 to 1:10.

Figure 7:
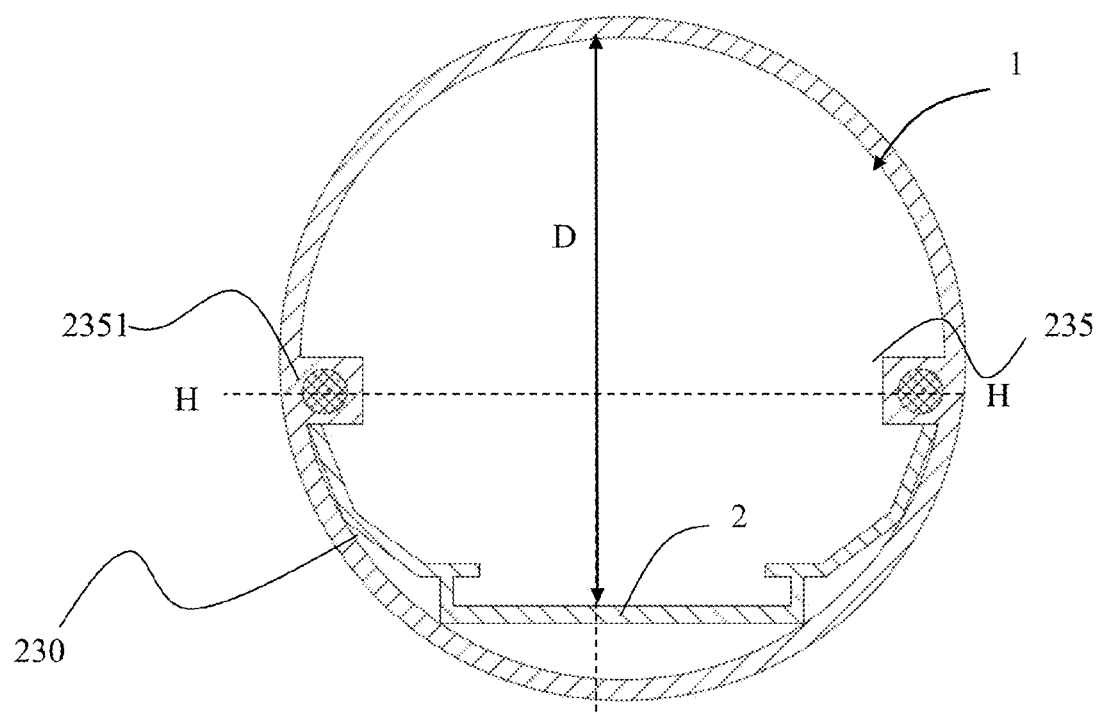
FIG. 7 is a cross-sectional view illustrating a ridge, which extends in an axial direction along an inner surface of the lamp tube, in accordance with an exemplary embodiment.

Turing to FIG. 7, in accordance with an exemplary embodiment, the lamp tube 1 further includes a ridge 235. The ridge 235 extends in an axial direction along an inner surface of the lamp tube 1. The ridge 235 is an elongated hollow structure unbroken from end to end, or alternatively, broken at intervals. Injection molding is used for producing the reinforcing portion 230 and the ridge 235 in an integral piece. The position of the ridge 235 in relation to the line H-H bisecting the hypothetical circle defined by the lamp tube 1 depends on, as elaborated earlier, one or more considerations, such as, for example, field angle, heatsink efficiency and structural strength.

In an embodiment, the lamp tube 1 further includes a ridge 235 and a maintaining stick 2351. The maintaining stick 2351 is, likewise, an elongated structure, which is unbroken from end to end, or alternatively, broken at intervals, and which fills up the space inside the ridge 235. The maintaining stick 2351 is made of thermally conductive plastic, or alternatively, metal. The metal is one of carbon steel, cast steel, nickel chrome steel, alloyed steel, ductile iron, grey cast iron, white cast iron, rolled manganese bronze, rolled phosphor bronze, cold-drawn bronze, rolled zinc, aluminum alloy and copper alloy. The material from which the maintaining stick 2351 is made is chosen to provide the LED tube lamp with a combination of heat dissipation capability and structural strength that is otherwise absent from other parts of the lamp tube 1. In an embodiment, the maintaining stick 2351 is made from a different material than the material from which the LED light strip 2 or the reinforcing portion 107 is made. For example, when the LED light strip 2 or the reinforcing portion 107 of the lamp tube 1 is made from a metal having heat dissipation capabilities but insufficient stiffness, e.g. aluminum panel, the maintaining stick 2351 may be made from a metal stiffer than aluminum to supply more structural strength. In some embodiments, the ratio of the volume of heatsinking-oriented metal to the volume of stiffness-oriented metal in a lamp tube 1 is from 0.001:1 to 100:1. In some embodiments, the ratio of the volume of heatsinking-oriented metal to the volume of stiffness-oriented metal in a lamp tube 1 is from 0.1:1 to 10:1. In some embodiments, the ratio of the cross sectional area of the maintaining stick 2351 to that of the lamp tube 1 is from 1:20 to 1:100. In some embodiments, the ratio of the cross sectional area of the maintaining stick 2351 to that of the lamp tube 1 is from 1:50 to 1:100.

In some embodiments, the lamp tube 1 includes a light transmissive portion and a reinforcing portion. In other embodiments, a ridge is substituted for the reinforcing portion. Thus, in these embodiment, the lamp tube 1 includes a light transmissive portion and a ridge, but no reinforcing portion. In an exemplary embodiment, the lamp tube 1 further includes a maintaining stick that fills up the space inside the ridge.

The outer surface of the reinforcing portion forms an outer surface of the lamp tube 1, as the embodiments in FIGS. 1-6. Alternatively, the outer surface of the reinforcing portion forms none of the outer surface of the lamp tube, as the embodiments in FIGS. 7-11. Where the reinforcing portion 107 is disposed entirely inside the lamp tube 1, the reinforcing portion 107 rests on the inner surface of the lamp tube 1 along a substantially uninterrupted interface, as the embodiment in FIG. 8; or alternatively, along an interrupted interface, as the embodiments in FIGS. 7, 9-11.

Focusing on FIG. 7, in accordance with an exemplary embodiment, a first compartment is defined by the reinforcing portion 107 and the inner surface of the lamp tube 1. A second compartment is defined by the LED light strip 2 and the inner surface of the lamp tube 1. Likewise, in FIG. 8, a compartment is defined by the platform 231, the horizontal rib and the curvilinear rib. In some embodiments, a ridge is disposed inside the compartment for great structural strength. In other embodiments, a maintaining stick fills up the space inside the hollow structure of the ridge.

The length of the reinforcing portion, on which the LED light assembly is disposed, in the vertical direction in relation to the diameter of the lamp tube depends on the field angle the lamp tube is designed to produce. In the embodiment shown in FIG. 7, the ratio of the distance (D) between the LED light assembly and the dome of the lamp tube 1 to the diameter of the lamp tube 1 is from 0.25 to 0.9. In some embodiments, the ratio of the distance (D) between the LED light assembly and the dome of the lamp tube 1 to the diameter of the lamp tube 1 is from 0.33 to 0.75.

Figure 8:
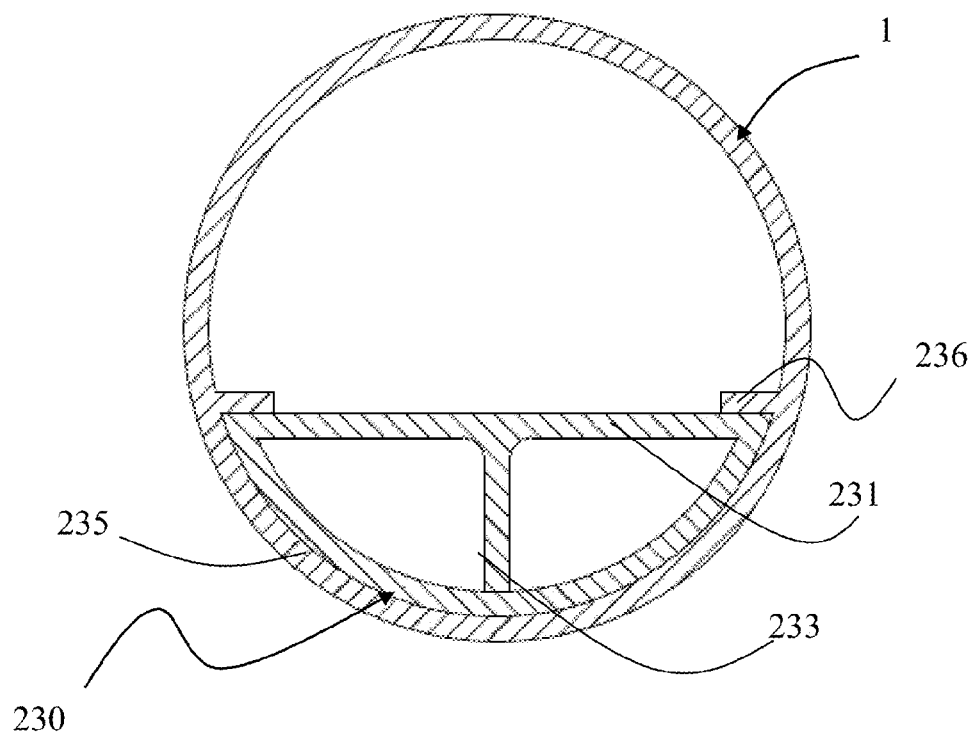
FIG. 8 is a cross-sectional view illustrating a compartment, which is defined by the bracing structure of the lamp tube, in accordance with an exemplary embodiment.

Turning to FIG. 8, in accordance with an exemplary embodiment, the lamp tube further includes a pair of protruding bars 236. The protruding bar 236 extends in an axial direction along an inner surface of the lamp tube 1 and is configured to form a guiding channel inside the lamp tube 1. The reinforcing portion 107 is connected to the lamp tube 1 by sliding the reinforcing portion 107 into the guiding channel. In the embodiment, a cross section of an inner surface of the lamp tube 1 defines a hypothetical circle. A cross section of the curvilinear rib 230 defines a lower arc on the circle. A cross section of the platform 231 and the vertical rib 233 approximates that of a hypothetical T-beam. All three ends of the T-beam sit on the lower arc. The pair of protruding bars 236 and the inner surface of the lamp tube 1 form the guiding channel in the lamp tube 1. The cross section of the guiding channel is defined by the flange of the T-beam and the lower arc. The reinforcing portion 107 is thus configured to fit snugly into the guiding channel.

Figure 9:
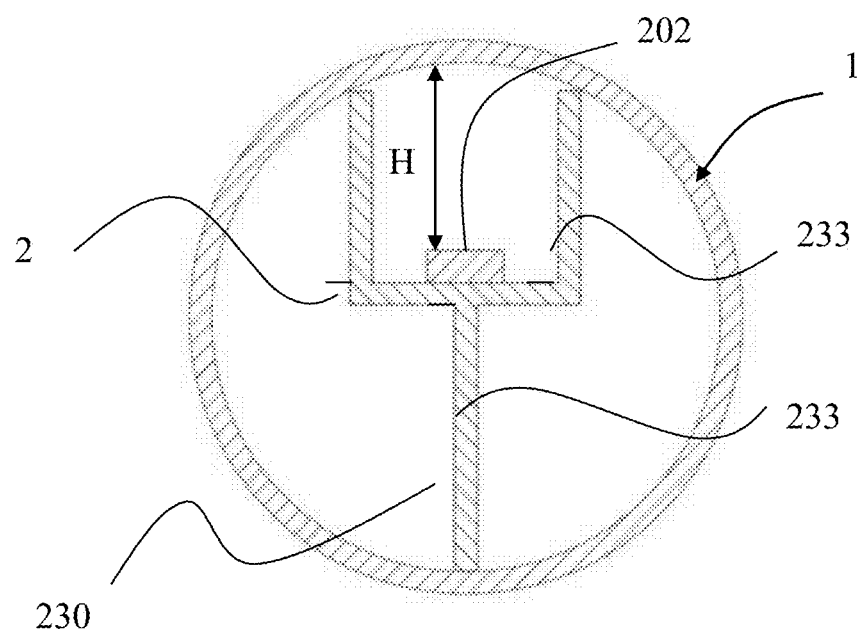
FIG. 9 is a cross-sectional view illustrating the bracing structure of the lamp tube in accordance with an exemplary embodiment.
Figure 10:
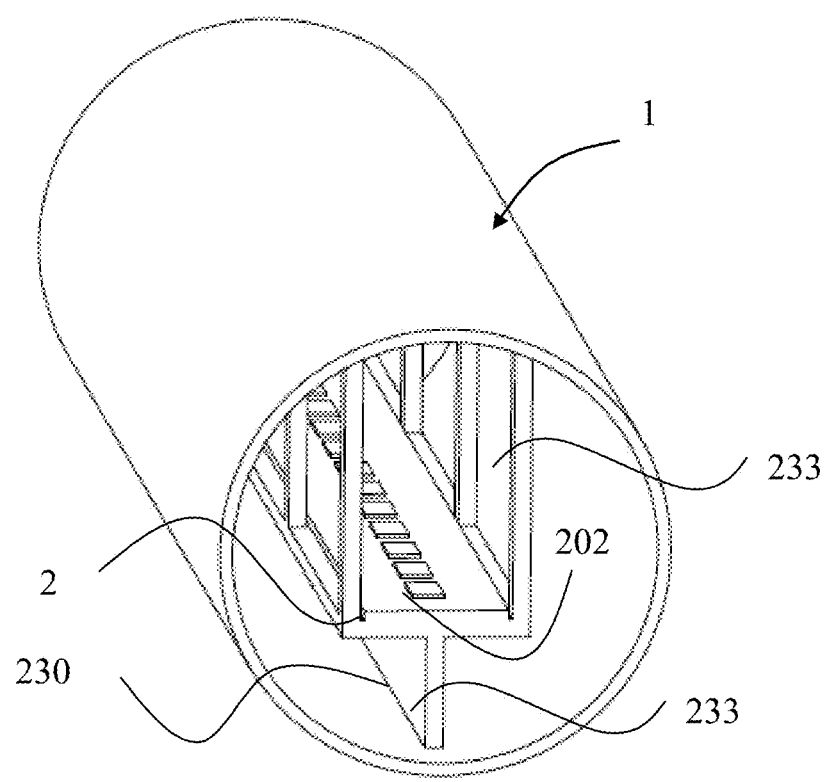
FIG. 10 is a perspective view of the lamp tube shown in FIG. 9.

Turning to FIGS. 9 and 10, in accordance with an exemplary embodiment, the reinforcing portion 230 includes a plurality of vertical ribs 233. The vertical rib 233 is fixedly connected to the inner surface of the lamp tube 1 on one end and to the LED light strip 2 on the other end. The LED light assembly is thus spaced apart from inner surface of the plastic lamp tube 1. The plastic lamp tube 1 is protected from heat generated by the LED light assembly because the heat is taken away from the lamp tube 1 by the plurality of the vertical ribs 233. A cross section of the lamp tube 1 cuts through an LED light source 202, a first vertical rib 233 connected to an upper surface of the LED light assembly, a second vertical rib 233 connected to a lower surface of the LED light assembly or any combination of the above. For example, the LED light assembly, the first vertical rib 233 and the second vertical rib 233 may be aligned with one another, or alternatively, may be staggered. In an embodiment, the second vertical rib 233 connected to the lower surface of the LED light assembly is an unbroken structure extending along the longitudinal axis of the lamp tube 1 for better heat dissipation and more structural strength. In FIG. 10, the plurality of first vertical ribs 233 are spaced apart from one another like an array of pillars. However, the second vertical rib 233 extends uninterruptedly between the lower surface of the LED light assembly and the lamp tube 1 like a wall.

Figure 11:
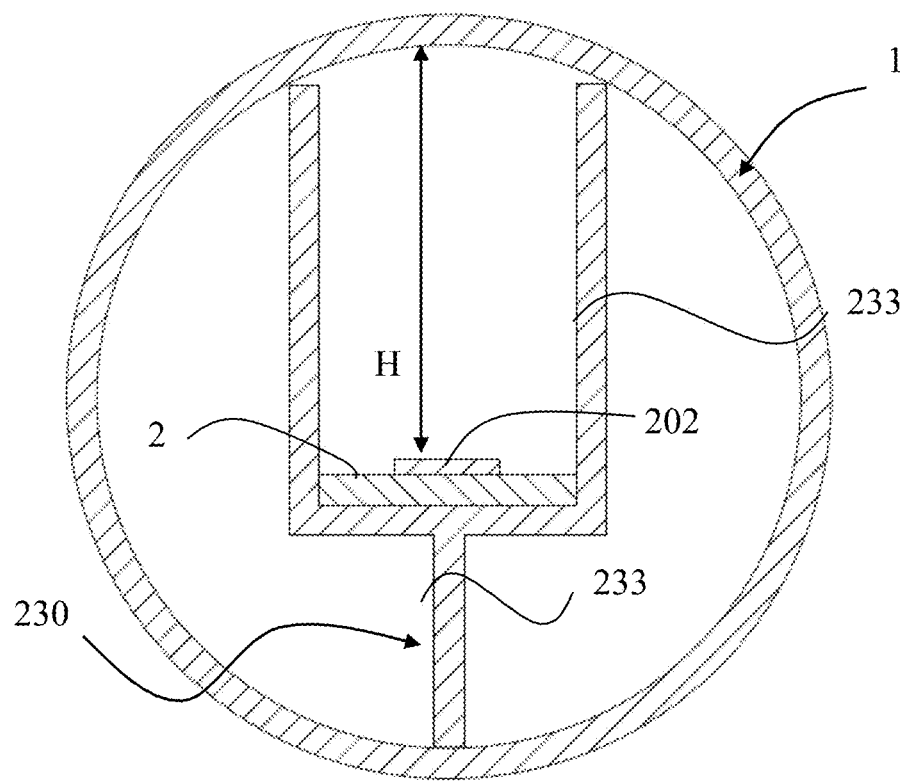
FIG. 11 is a cross-sectional view illustrating the bracing structure of the lamp tube in accordance with an exemplary embodiment.

Turning to FIG. 11, in accordance with an exemplary embodiment, the reinforcing portion 230 further includes a platform. The vertical rib 233 is fixedly connected to, instead of the LED light assembly, the platform on one end and to the inner surface on the other end. The vertical ribs 233 and the platform are thus one integral structure. The LED light assembly is thermally connected to an upper surface of the platform.

The position of the LED light strip 2 inside the lamp tube 1—i.e. the length of the first vertical rib 233 and the length of the second vertical rib 233—is chosen in light of one or more factors, such as, for example, field angle, heat-dissipating capability and structural strength. In FIGS. 9 and 11, the ratio of the distance (H) between the LED light strip 2 and the dome of the lamp tube 1 to the diameter of the lamp tube 1 is from 0.25 to 0.9. In some embodiments, the ratio of the distance (H) between the LED light strip 2 and the dome of the lamp tube 1 to the diameter of the lamp tube 1 may be from 0.33 to 0.75.

Figure 12:
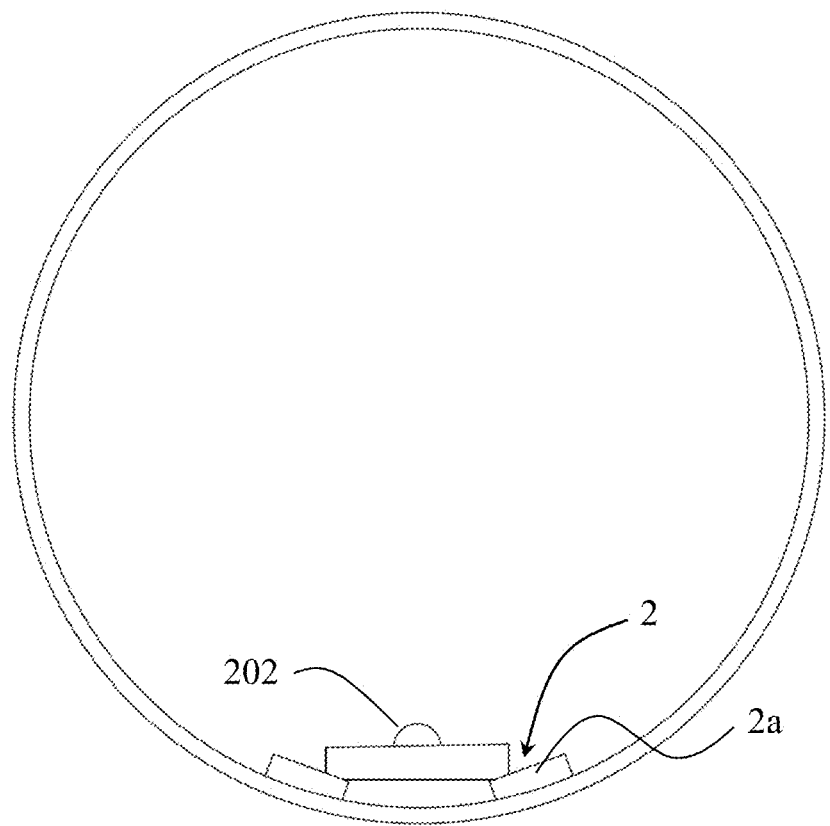
FIG. 12 is a cross-sectional view illustrating the LED light strip with a wiring layer in accordance with an exemplary embodiment.
Figure 13:
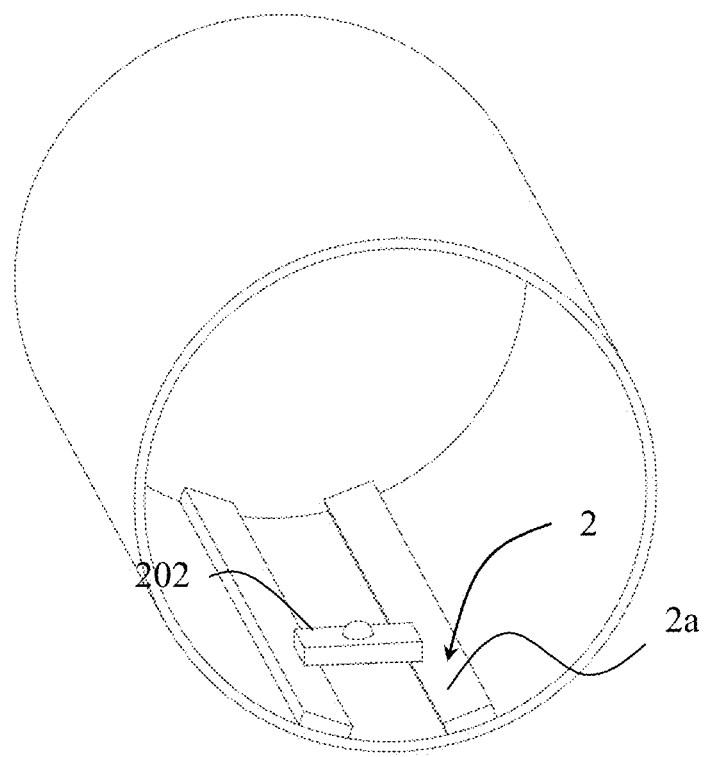
FIG. 13 is a perspective view of the lamp tube shown in FIG. 12.
Figure 16:
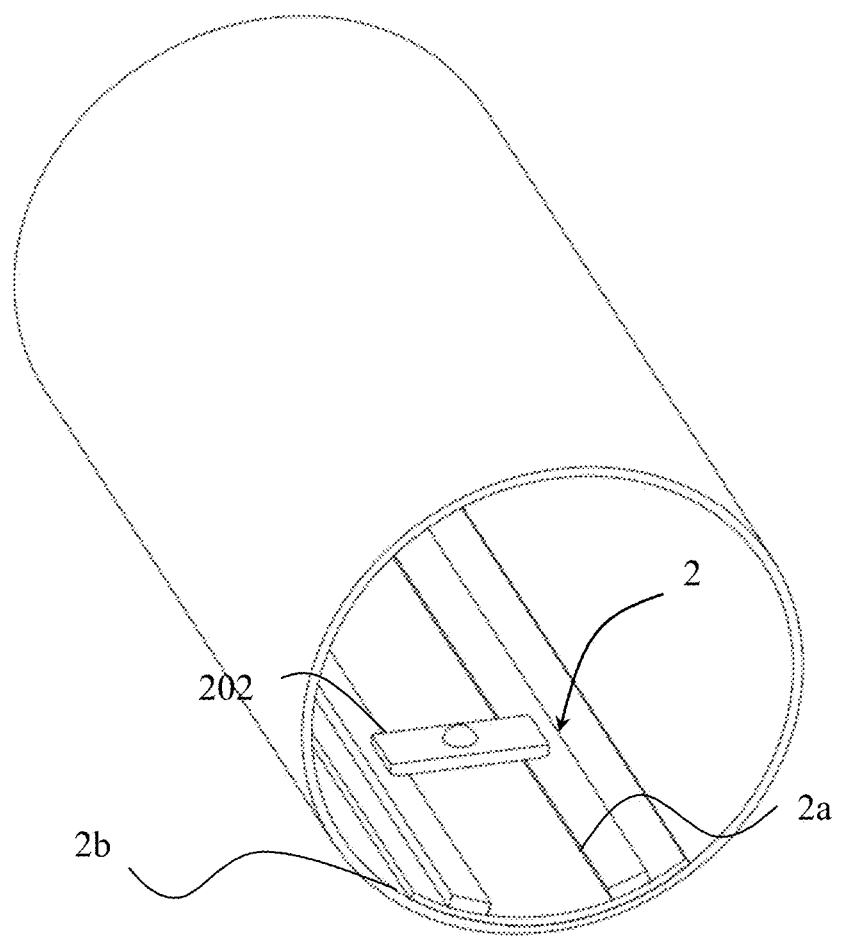
FIG. 16 is a perspective view illustrating a dielectric layer disposed on the wiring layer adjacent to the lamp tube in accordance with an exemplary embodiment.
Figure 17:
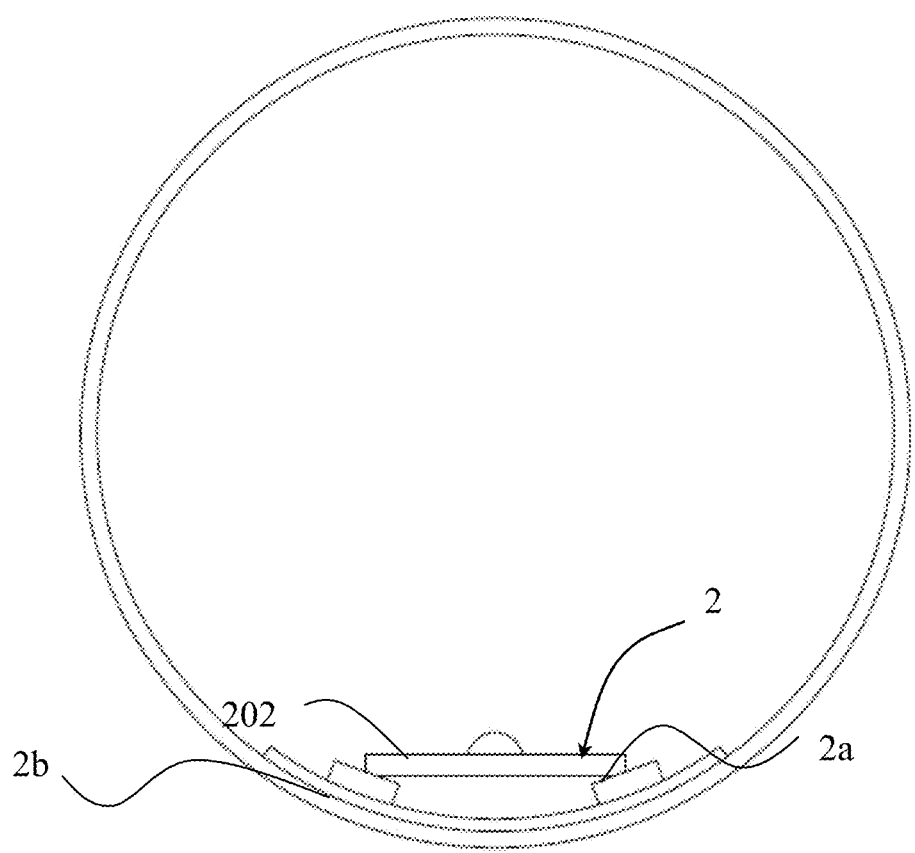
FIG. 17 is a perspective view of the lamp tube shown in FIG. 16.

In an embodiment, the LED light strip is made from flexible substrate material. Referring to FIGS. 12 and 13, in accordance with an exemplary embodiment, the flexible LED light strip 2 includes a wiring layer 2a. The wiring layer 2a is an electrically conductive layer, e.g. a metallic layer or a layer of copper wire, and is electrically connected to the power supply. The LED light source 202 is disposed on and electrically connected to a first surface of the wiring layer 2a. Turning to FIGS. 16 and 17, the LED light strip 2 further includes a dielectric layer 2b. The dielectric layer 2b is disposed on a second surface of the wiring layer 2a. The dielectric layer 2b has a different surface area than the wiring layer 2a. The LED light source 202 is disposed on a surface of the wiring layer 2a which is opposite to the other surface of the wiring layer 2a which is adjacent to the dielectric layer 2b. The wiring layer 2a can be a metal layer or a layer having wires such as copper wires.

In an embodiment, the LED light strip 2 further includes a protection layer over the wiring layer 2a and the dielectric layer 2b. The protection layer is made from one of solder resists such as liquid photoimageable.

Figure 14:
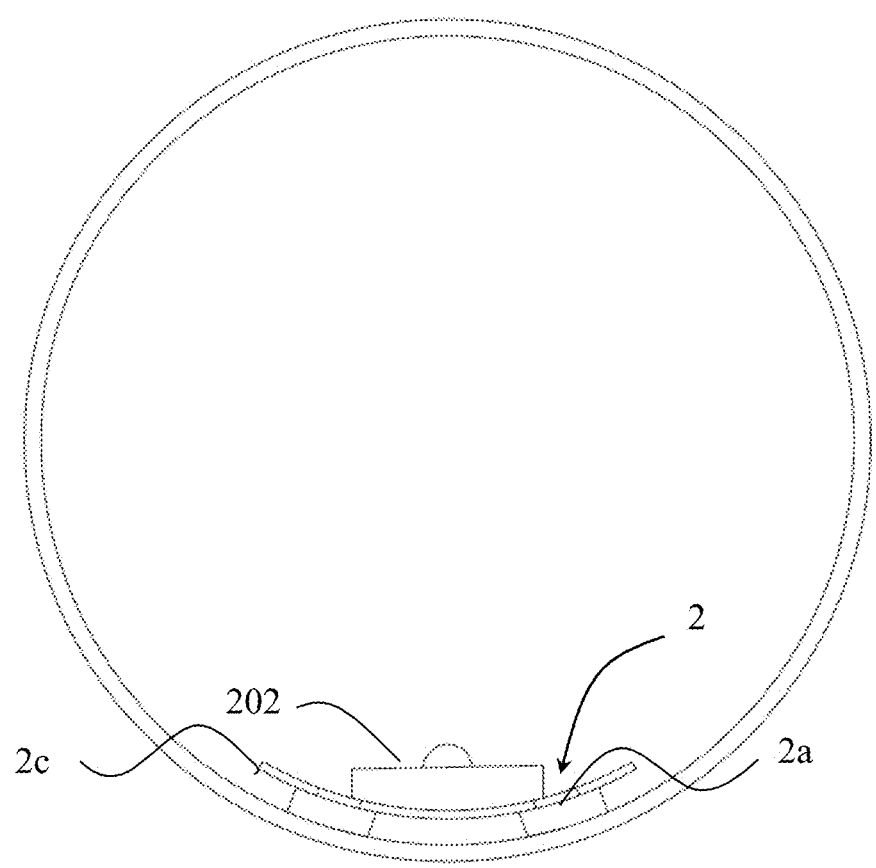
FIG. 14 is cross-sectional view illustrating a protection layer disposed on the wiring layer in accordance with an exemplary embodiment.
Figure 15:
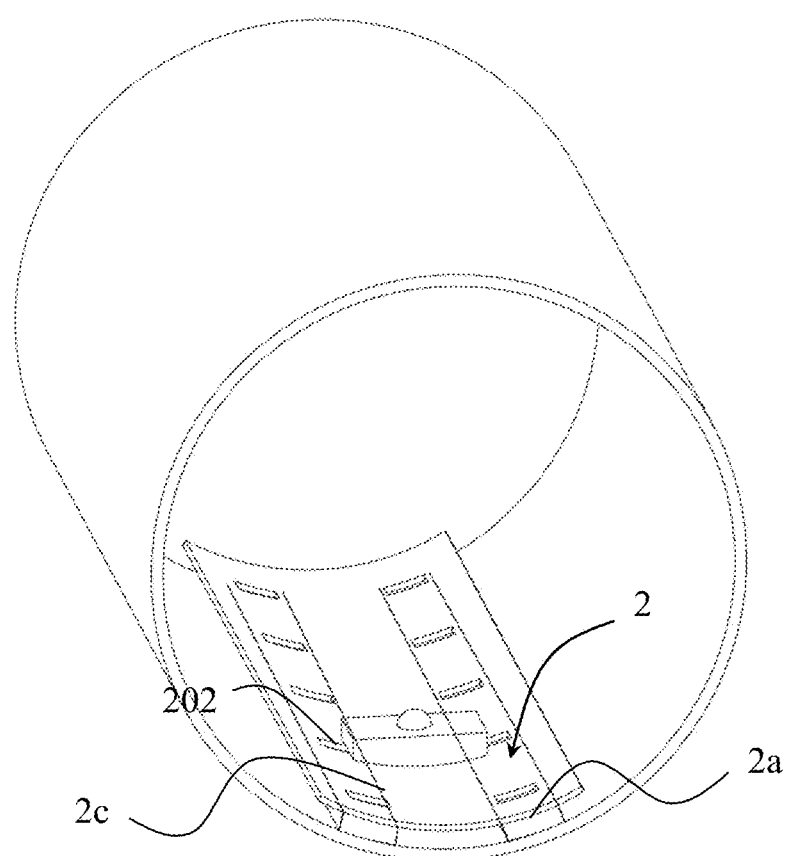
FIG. 15 is a perspective view of the lamp tube shown in FIG. 14.

In another embodiment, as shown in FIGS. 14 and 15, the outer surface of the wiring layer 2a or the dielectric layer 2b (i.e. the two layered structure) may be covered with a circuit protective layer 2c made of an ink with function of resisting soldering and increasing reflectivity. Alternatively, the dielectric layer 2b can be omitted and the wiring layer 2a can be directly bonded to the inner circumferential surface of the lamp tube (i.e. the one-layered structure), and the outer surface of the wiring layer 2a is coated with the circuit protective layer 2c. As shown in FIGS. 14 and 15, the circuit protective layer 2c is formed with openings such that the LED light sources 202 are electrically connected to the wiring layer 2a. Whether the one-layered or the two-layered structure is used, the circuit protective layer 2c can be adopted. The bendable circuit sheet is a one-layered structure made of just one wiring layer 2a, or a two-layered structure made of one wiring layer 2a and one dielectric layer 2b, and thus is more bendable or flexible to curl when compared with the conventional three-layered flexible substrate (one dielectric layer sandwiched with two wiring layers). As a result, the bendable circuit sheet of the LED light strip 2 can be installed in a lamp tube with a customized shape or non-tubular shape, and fitly mounted to the inner surface of the lamp tube. In some embodiments, it may be preferable to mount the bendable circuit sheet closely to the inner surface of the lamp tube. In addition, using fewer layers of the bendable circuit sheet improves the heat dissipation and lowers the material cost.

In some embodiments, any type of power supply 5 can be electrically connected to the LED light strip 2 by means of a traditional wire bonding technique, in which a metal wire has an end connected to the power supply 5 while has the other end connected to the LED light strip 2. Furthermore, the metal wire may be wrapped with an electrically insulating tube to protect a user from being electrically shocked. However, the bonded wires tend to be easily broken during transportation and can therefore cause quality issues.

In still another embodiment, the connection between the power supply 5 and the LED light strip 2 may be accomplished via tin soldering, rivet bonding, or welding. One way to secure the LED light strip 2 is to provide the adhesive sheet at one side thereof and adhere the LED light strip 2 to the inner surface of the lamp tube 1 via the adhesive sheet. Two ends of the LED light strip 2 can be either fixed to or detached from the inner surface of the lamp tube 1.

In some embodiments, when two ends of the LED light strip 2 are fixed to the inner surface of the lamp tube 1, it may be preferable that the bendable circuit sheet of the LED light strip 2 is provided with the female plug and the power supply is provided with the male plug to accomplish the connection between the LED light strip 2 and the power supply 5. In this case, the male plug of the power supply is inserted into the female plug to establish electrical connection.

In cases in which two ends of the LED light strip 2 are detached from the inner surface of the lamp tube and the LED light strip 2 is connected to the power supply 5 via wire-bonding, any movement in subsequent transportation is likely to cause the bonded wires to break. Therefore, in some embodiments, the connection between the light strip 2 and the power supply 5 could be soldered. Specifically, the ends of the LED light strip 2 including the bendable circuit sheet are arranged to pass over the strengthened transition region and directly soldering bonded to an output terminal of the power supply 5 such that the product quality is improved without using wires. In this way, the female plug and the male plug respectively provided for the LED light strip 2 and the power supply 5 are no longer needed.

Figure 18:
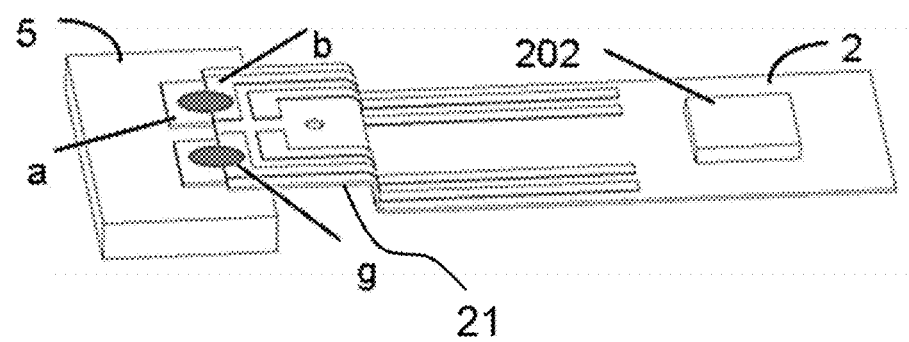
FIG. 18 is a perspective view illustrating a soldering pad on the bendable circuit sheet of the LED light strip to be joined together with the printed circuit board of the power supply in accordance with an exemplary embodiment.

Referring to FIG. 18, an output terminal of the printed circuit board of the power supply 5 may have soldering pads "a" provided with an amount of tin solder with a thickness sufficient to later form a solder joint. Correspondingly, the ends of the LED light strip 2 may have soldering pads "b". The soldering pads "a" on the output terminal of the printed circuit board of the power supply 5 are soldered to the soldering pads "b" on the LED light strip 2 via the tin solder on the soldering pads "a". The soldering pads "a" and the soldering pads "b" may be face-to-face during soldering to achieve a firm connection between the LED light strip 2 and the printed circuit board of the power supply 5. However, with this kind of soldering, a thermo-compression head presses on the rear surface of the LED light strip 2 and heats the tine solder, i.e., the LED light strip 2 intervenes between the thermo-compression head and the tin solder, and therefore may cause reduced reliability. Referring to FIG. 24, a through hole may be formed in each of the soldering pads "b" on the LED light strip 2 to allow the soldering pads "b" overlay the soldering pads "b" without face-to-face and the thermo-compression head directly presses tin solders on the soldering pads "a" on surface of the printed circuit board of the power supply 5 when the soldering pads "a" and the soldering pads "b" are vertically aligned. This is an easy way to accomplish in practice.

Referring again to FIG. 18, two ends of the LED light strip 2 detached from the inner surface of the lamp tube 1 are formed as freely extending portions 21, while most of the LED light strip 2 is attached and secured to the inner surface of the lamp tube 1. One of the freely extending portions 21 has the soldering pads "b" as mentioned above. Upon assembling of the LED tube lamp, the freely extending end portions 21 along with the soldered connection of the printed circuit board of the power supply 5 and the LED light strip 2 would be coiled, curled up or deformed to be fittingly accommodated inside the lamp tube 1.

In this embodiment, during the connection of the LED light strip 2 and the power supply 5, the soldering pads "b" and the soldering pads "a" and the LED light sources 202 are on surfaces facing toward the same direction and the soldering pads "b" on the LED light strip 2 are each formed with a through hole "e" as shown in FIG. 24 such that the soldering pads "b" and the soldering pads "a" communicate with each other via the through holes "e". When the freely extending end portions 21 are deformed due to contraction or curling up, the soldered connection of the printed circuit board of the power supply 5 and the LED light strip 2 exerts a lateral tension on the power supply 5. Furthermore, the soldered connection of the printed circuit board of the power supply 5 and the LED light strip 2 also exerts a downward tension on the power supply 5 when compared with the situation where the soldering pads "a" of the power supply 5 and the soldering pads "b" of the LED light strip 2 are face to face. This downward tension on the power supply 5 comes from the tin solders inside the through holes "e" and forms a stronger and more secure electrical connection between the LED light strip 2 and the power supply 5.

Referring to FIG. 19, in one embodiment, the soldering pads "b" of the LED light strip 2 are two separate pads to electrically connect the positive and negative electrodes of the bendable circuit sheet of the LED light strip 2, respectively. The size of the soldering pads "b" may be, for example, about 3.5×2 mm². The printed circuit board of the power supply 5 is correspondingly provided with soldering pads "a" having reserved tin solders and the height of the tin solders suitable for subsequent automatic soldering bonding process is generally, for example, about 0.1 to 0.7 mm. In some embodiments, the height of the tin solders suitable for subsequent automatic soldering bonding process may be 0.3 to 0.5 mm. And, in some embodiments, the height of the tin solders suitable for subsequent automatic soldering bonding process may be about 0.4 mm. An electrically insulating through hole "c" may be formed between the two soldering pads "b" to isolate and prevent the two soldering pads from electrically short during soldering. Furthermore, an extra positioning opening "d" may also be provided behind the electrically insulating through hole "c" to allow an automatic soldering machine to quickly recognize the position of the soldering pads "b".

There is at least one soldering pad "b" for separately connecting to the positive and negative electrodes of the LED light sources 202. For the sake of achieving scalability and compatibility, the amount of the soldering pads "b" on each end of the LED light strip 2 may be more than one such as two, three, four, or more than four. When there is only one soldering pad "b" provided at each end of the LED light strip 2, the two ends of the LED light strip 2 are electrically connected to the power supply 5 to form a loop, and various electrical components can be used. For example, a capacitance may be replaced by an inductance to perform current regulation. Referring to FIGS. 20 to 23, when each end of the LED light strip 2 has three soldering pads, the third soldering pad can be grounded; when each end of the LED light strip 2 has four soldering pads, the fourth soldering pad can be used as a signal input terminal. Correspondingly, the power supply 5 may have a same number of soldering pads "a" as that of the soldering pads "b" on the LED light strip 2. As long as electrical short between the soldering pads "b" can be prevented, the soldering pads "b" may be arranged according to the dimension of the actual area for disposition, for example, three soldering pads can be arranged in a row or two rows. In other embodiments, the amount of the soldering pads "b" on the bendable circuit sheet of the LED light strip 2 may be reduced by rearranging the circuits on the bendable circuit sheet of the LED light strip 2. The lesser the amount of the soldering pads, the easier the fabrication process becomes. On the other hand, a greater number of soldering pads may improve and secure the electrical connection between the LED light strip 2 and the output terminal of the power supply 5.

Referring to FIG. 24, in another embodiment, each soldering pad "b" is formed with a through hole "e" having a diameter generally of about 1 to 2 mm, in some embodiments of about 1.2 to 1.8 mm, and in yet some embodiments of about 1.5 mm. The through hole "e" communicates the soldering pad "a" with the soldering pad "b" so that the tin solder on the soldering pads "a" passes through the through holes "e" and finally reach the soldering pads "b". A smaller through holes "e" would make it difficult for the tin solder to pass. The tin solder accumulates around the through holes "e" upon exiting the through holes "e" and condense to form a solder ball "g" with a larger diameter than that of the through holes "e" upon condensing. Such a solder ball "g" functions as a rivet to further increase the stability of the electrical connection between the soldering pads "a" on the power supply 5 and the soldering pads "b" on the LED light strip 2.

Figure 25:
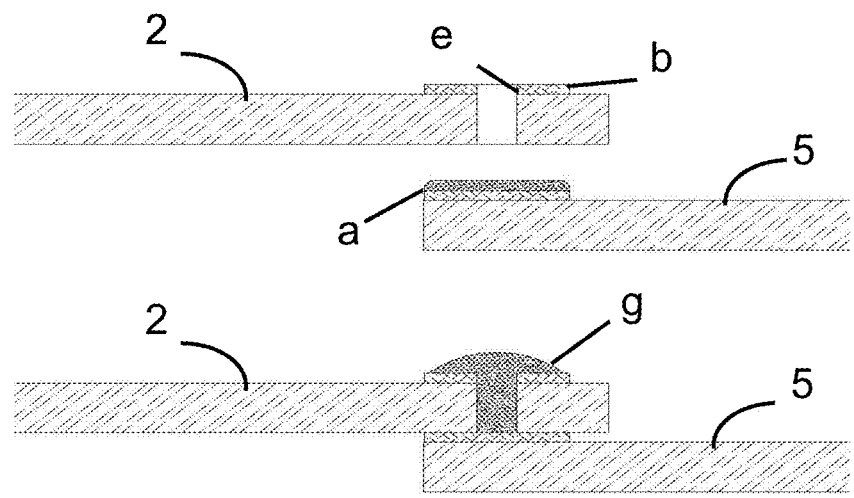
FIG. 25 is a cross-sectional view illustrating the soldering bonding process, which utilizes the soldering pads of the bendable circuit sheet of the LED light strip shown in FIG. 30 taken from side view and the printed circuit board of the power supply, in accordance with an exemplary embodiment.
Figure 26:
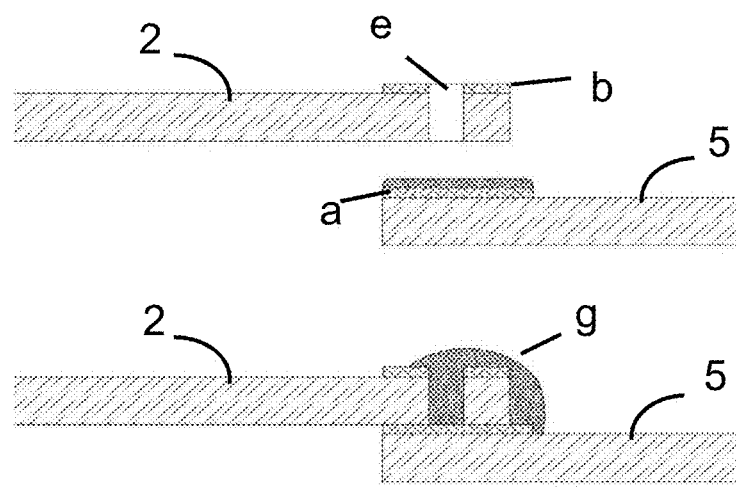
FIG. 26 is a cross-sectional view illustrating the soldering bonding process, which utilizes the soldering pads of the bendable circuit sheet of the LED light strip shown in FIG. 24, wherein the through hole of the soldering pads is near the edge of the bendable circuit sheet, in accordance with an exemplary embodiment.
Figure 27:
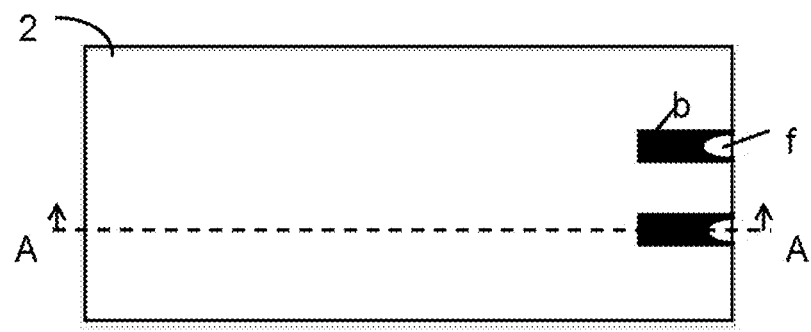
FIG. 27 is a planar view illustrating notches formed on the soldering pads in accordance with an exemplary embodiment.
Figure 28:
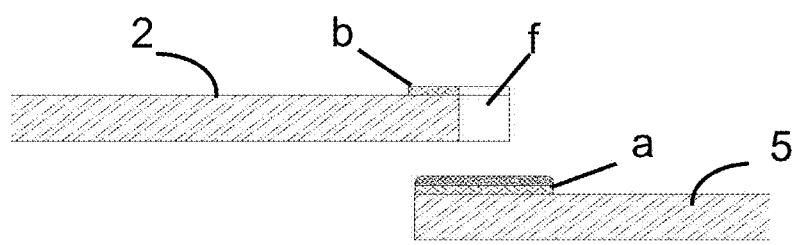
FIG. 28 is a cross-sectional view of the LED light strip shown in FIG. 27 along the line A-A.
Figure 28:
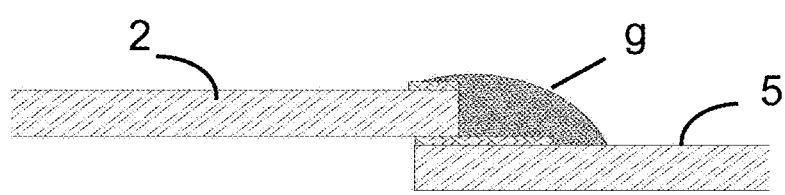

Referring to FIGS. 25 to 26, in other embodiments, when a distance from the through hole "e" to the side edge of the LED light strip 2 is less than 1 mm, the tin solder may pass through the through hole "e" to accumulate on the periphery of the through hole "e", and extra tin solder may spill over the soldering pads "b" to reflow along the side edge of the LED light strip 2 and join the tin solder on the soldering pads "a" of the power supply 5. The tin solder then condenses to form a structure like a rivet to firmly secure the LED light strip 2 onto the printed circuit board of the power supply 5 such that reliable electric connection is achieved. Referring to FIGS. 27 and 28, in another embodiment, the through hole "e" can be replaced by a notch "f" formed at the side edge of the soldering pads "b" for the tin solder to easily pass through the notch "f" and accumulate on the periphery of the notch "f" and to form a solder ball with a larger diameter than that of the notch "e" upon condensing. Such a solder ball may be formed like a C-shape rivet to enhance the secure capability of the electrically connecting structure.

The abovementioned through hole "e" or notch "f" might be formed in advance of soldering or formed by direct punching with a thermo-compression head during soldering.

The portion of the thermo-compression head for touching the tin solder may be flat, concave, or convex, or any combination thereof. The portion of the thermo-compression head for restraining the object to be soldered such as the LED light strip 2 may be strip-like or grid-like. The portion of the thermo-compression head for touching the tin solder does not completely cover the through hole "e" or the notch "f" to make sure that the tin solder is able to pass through the through hole "e" or the notch "f". The portion of the thermo-compression head being concave may function as a room to receive the solder ball.

The power supply 5 is electrically coupled to the LED light strip 2 and the features and applications of the related power supply assembly are described below. In some embodiments, for practical purposes, the circuits and the assemblies mentioned below may be all disposed on the reinforcing portion in the lamp tube to increase the heat dissipating area and efficiency, simplify the circuit design in the end cap, and provide an easier control for the length of the lamp tube in manufacturing. Or, some of them are kept in the end cap (e.g. resistors, capacitors, or the components with smaller volume or smaller power consumption, the components generating less heat or having better heat resistant) and the others are disposed on the reinforcing portion (e.g. chips, inductors, transistors, or the components with bigger volume, the components generating much heat or having poor heat resistant) so as to increase the heat dissipating area and efficiency and simplify the circuit design in the end cap.

In some embodiments, for example, the circuits and the assemblies disposed on the reinforcing portion in the lamp tube may be implemented by surface mount components. Some of the circuits and the assemblies may be disposed on the LED light strip and then electrically connected to the circuit(s) kept in the end cap via male-female plug or wire with insulating coating/layer for achieving the isolation effect. Or, the circuits and the assemblies related to the power supply may all be disposed on the LED light strip to reduce the reserved length of the LED light strip, which is used for connecting to other circuit board(s), and also to reduce the allowable error length and omit the process for electrically connecting two or more circuit boards, so that the lengths of the lamp tube and the LED light strip could be controlled more precisely. The circuits and the assemblies and the LEDs may be disposed on the same or different side of the reinforcing portion. In some embodiments, the circuits and the assemblies and the LEDs may be disposed on the same side to reduce the process of making through hole(s) on the reinforcing portion for electrically connection.

Figure 29A:
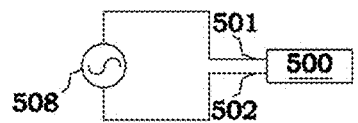
FIG. 29A is a block diagram of an exemplary power supply module in an LED tube lamp according to some embodiments.

FIG. 29A is a block diagram of a power supply system for an LED tube lamp according to an embodiment. Referring to FIG. 29A, an alternating (AC) power supply 508 is used to supply an AC supply signal, and may be an AC powerline with a voltage rating, for example, in 100-277 volts and a frequency rating, for example, of 50 or 60 Hz. An LED tube lamp 500 receives an external driving signal, in the present embodiment, the external driving signal is an AC driving signal from the AC power supply 508, and is thus driven to emit light. In the present embodiment, the LED tube lamp 500 is in a driving environment in which it is power-supplied at its one end cap having two conductive pins 501 and 502, which are used to receive the external driving signal. The two conductive pins 501 and 502 may be electrically coupled to, either directly or indirectly, the AC power supply 508 to receive the AC driving signal.

Figure 29B:
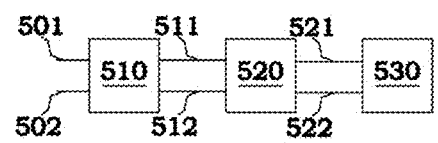
FIG. 29B is a block diagram of an exemplary LED lamp according to some embodiments.

FIG. 29B is a block diagram of an LED lamp according to one embodiment. Referring to FIG. 29B, the power supply module of the LED lamp includes a rectifying circuit 510, a filtering circuit 520, and may further include some parts of an LED lighting module 530. The rectifying circuit 510 is coupled to two pins 501 and 502 to receive and then rectify an external driving signal, so as to output a rectified signal at two rectifying output terminals 511 and 512. The external driving signal may be the AC driving signal or the AC supply signal described with reference to FIG. 29A, or may be a direct current (DC) signal, which embodiments do not alter the LED tube lamp, in certain exemplary embodiments. The filtering circuit 520 is coupled to the rectifying circuit for filtering the rectified signal to produce a filtered signal. For instance, the filtering circuit 520 is coupled to the rectifying output terminals 511 and 512 to receive and then filter the rectified signal, so as to output a filtered signal at two filtering output terminals 521 and 522. The LED lighting module 530 is coupled to the filtering circuit 520 to receive the filtered signal for emitting light. For instance, the LED lighting module 530 may be a circuit coupled to the filtering output terminals 521 and 522 to receive the filtered signal and thereby to drive an LED unit (not shown) in LED lighting module 530 to emit light. Details of these operations are described in below descriptions of certain embodiments.

It is worth noting that although there are two rectifying output terminals 511 and 512 and two filtering output terminals 521 and 522 in embodiments of these FIGS., in practice the number of ports or terminals for coupling between the rectifying circuit 510, the filtering circuit 520, and the LED lighting module 530 may be one or more depending on the needs of signal transmission between the circuits or devices.

In addition, the power supply module of the LED lamp described in FIG. 29B, and embodiments of the power supply module of an LED lamp described below, may each be used in the LED tube lamp 500 in FIG. 29A, and may instead be used in any other type of LED lighting structure having two conductive pins used to conduct power, such as LED light bulbs, personal area lights (PAL), plug-in LED lamps with different types of bases (such as types of PL-S, PL-D, PL-T, PL-L, etc.), etc.

Figure 30:
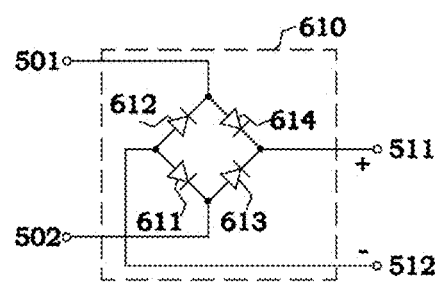
FIG. 30 is a schematic diagram of a rectifying circuit according to some embodiments.

FIG. 30 is a schematic diagram of a rectifying circuit according to an embodiment. Referring to FIG. 30, a rectifying circuit 610, i.e. a bridge rectifier, includes four rectifying diodes 611, 612, 613, and 614, configured to full-wave rectify a received signal. The diode 611 has an anode connected to the output terminal 512, and a cathode connected to the pin 502. The diode 612 has an anode connected to the output terminal 512, and a cathode connected to the pin 501. The diode 613 has an anode connected to the pin 502, and a cathode connected to the output terminal 511. The diode 614 has an anode connected to the pin 501, and a cathode connected to the output terminal 511.

When the pins 501 and 502 receive an AC signal, the rectifying circuit 610 operates as follows. During the connected AC signal's positive half cycle, the AC signal is input through the pin 501, the diode 614, and the output terminal 511 in sequence, and later output through the output terminal 512, the diode 611, and the pin 502 in sequence. During the connected AC signal's negative half cycle, the AC signal is input through the pin 502, the diode 613, and the output terminal 511 in sequence, and later output through the output terminal 512, the diode 612, and the pin 501 in sequence. Therefore, during the connected AC signal's full cycle, the positive pole of the rectified signal produced by the rectifying circuit 610 keeps at the output terminal 511, and the negative pole of the rectified signal remains at the output terminal 512. Accordingly, the rectified signal produced or output by the rectifying circuit 610 is a full-wave rectified signal.

When the pins 501 and 502 are coupled to a DC power supply to receive a DC signal, the rectifying circuit 610 operates as follows. When the pin 501 is coupled to the positive end of the DC power supply and the pin 502 to the negative end of the DC power supply, the DC signal is input through the pin 501, the diode 614, and the output terminal 511 in sequence, and later output through the output terminal 512, the diode 611, and the pin 502 in sequence. When the pin 501 is coupled to the negative end of the DC power supply and the pin 502 to the positive end of the DC power supply, the DC signal is input through the pin 502, the diode 613, and the output terminal 511 in sequence, and later output through the output terminal 512, the diode 612, and the pin 501 in sequence. Therefore, no matter what the electrical polarity of the DC signal is between the pins 501 and 502, the positive pole of the rectified signal produced by the rectifying circuit 610 keeps at the output terminal 511, and the negative pole of the rectified signal remains at the output terminal 512.

Therefore, the rectifying circuit 610 in this embodiment can output or produce a proper rectified signal regardless of whether the received input signal is an AC or DC signal.

Figure 31A:
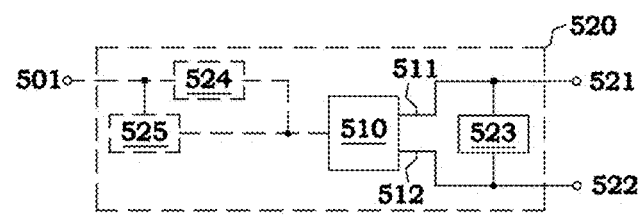
FIG. 31A is a block diagram of a filtering circuit according to some embodiments.

FIG. 31A is a block diagram of the filtering circuit according to an embodiment. A rectifying circuit 510 is shown in FIG. 31A for illustrating its connection with other components, without intending a filtering circuit 520 to include the rectifying circuit 510. Referring to FIG. 31A, the filtering circuit 520 includes a filtering unit 523 coupled to two rectifying output terminals 511 and 512 to receive and to filter out ripples of a rectified signal from the rectifying circuit 510. Accordingly, the waveform of a filtered signal is smoother than that of the rectified signal. The filtering circuit 520 may further include another filtering unit 524 coupled between a rectifying circuit and a pin correspondingly, for example, between the rectifying circuit 510 and the pin 501, the rectifying circuit 510 and the pin 502, the rectifying circuit 540 and the pin 503, and/or the rectifying circuit 540 and the pin 504. The filtering unit 524 is used to filter a specific frequency, for example, to filter out a specific frequency of an external driving signal. In this embodiment, the filtering unit 524 is coupled between the rectifying circuit 510 and the pin 501. The filtering circuit 520 may further include another filtering unit 525 coupled between one of the pins 501 and 502 and one of the diodes of the rectifying circuit 510, or between one of the pins 503 and 504 and one of the diodes of the rectifying circuit 540 to reduce or filter out electromagnetic interference (EMI). In this embodiment, the filtering unit 525 is coupled between the pin 501 and one of diodes of the rectifying circuit 510 (not shown in FIG. 31A). Since the filtering units 524 and 525 may be present or omitted depending on actual circumstances of their uses, they are depicted by a dotted line in FIG. 31A.

Figure 31B:
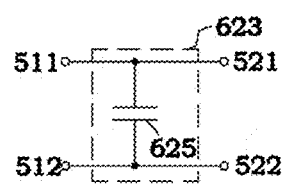
FIG. 31B is a block diagram of a filtering circuit according to some embodiments.

FIG. 31B is a schematic diagram of the filtering unit according to an embodiment. Referring to FIG. 31B, a filtering unit 623 includes a capacitor 625 having an end coupled to the output terminal 511 and a filtering output terminal 521 and the other end thereof coupled to the output terminal 512 and a filtering output terminal 522, and is configured to low-pass filter a rectified signal from the output terminals 511 and 512, so as to filter out high-frequency components of the rectified signal and thereby output a filtered signal at the filtering output terminals 521 and 522.

Figure 31C:
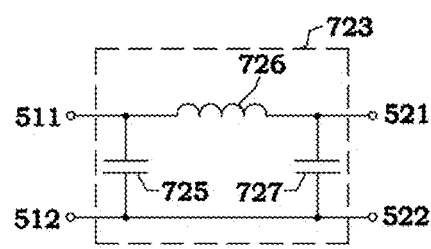
FIG. 31C is a block diagram of a filtering circuit according to some embodiments.

FIG. 31C is a schematic diagram of the filtering unit according to an embodiment. Referring to FIG. 31C, a filtering unit 723 includes a pi filter circuit including a capacitor 725, an inductor 726, and a capacitor 727. As is well known, a pi filter circuit looks like the symbol π in its shape or structure. The capacitor 725 has an end connected to the output terminal 511 and coupled to the filtering output terminal 521 through the inductor 726, and has another end connected to the output terminal 512 and the filtering output terminal 522. The inductor 726 is coupled between output terminal 511 and the filtering output terminal 521. The capacitor 727 has an end connected to the filtering output terminal 521 and coupled to the output terminal 511 through the inductor 726, and has another end connected to the output terminal 512 and the filtering output terminal 522.

As seen between the output terminals 511 and 512 and the filtering output terminals 521 and 522, the filtering unit 723 compared to the filtering unit 623 in FIG. 31B additionally has an inductor 726 and a capacitor 727, which perform the function of low-pass filtering like the capacitor 725 does. Therefore, the filtering unit 723 in this embodiment compared to the filtering unit 623 in FIG. 31B has a better ability to filter out high-frequency components to output a filtered signal with a smoother waveform.

The inductance values of the inductor 726 in the embodiments mentioned above are chosen in the range of, for example in some embodiments, about 10 nH to 10 mH. And the capacitance values of the capacitors 625, 725, and 727 in the embodiments stated above are chosen in the range of, for example in some embodiments, about 100 pF to 1 uF.

Figure 32A:
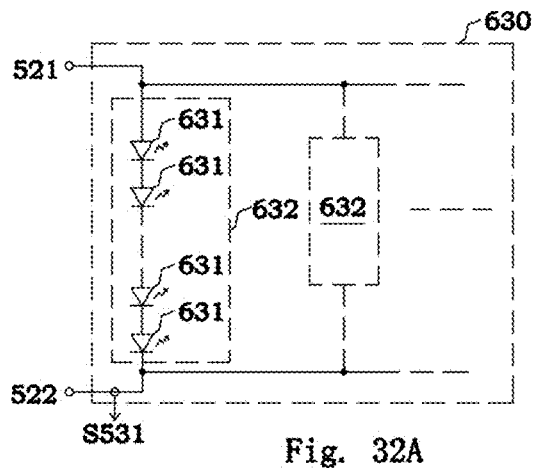
FIG. 32A is a schematic diagram of an LED module according to some embodiments.

FIG. 32A is a schematic diagram of an LED module according to an embodiment. Referring to FIG. 32A, an LED module 630 has an anode connected to a filtering output terminal 521, a cathode connected to a filtering output terminal 522, and includes at least one LED unit 632, such as the light source mentioned above. When two or more LED units are included, they are connected in parallel. The anode of each LED unit 632 is connected to the anode of LED module 630 to couple with the filtering output terminal 521, and the cathode of each LED unit 632 is connected to the cathode of LED module 630 to couple to the filtering output terminal 522. Each LED unit 632 includes at least one LED 631. When multiple LEDs 631 are included in an LED unit 632, they are connected in series with the anode of the first LED 631 connected to the anode of this LED unit 632 and the cathode of the first LED 631 connected to the next or second LED 631. And the anode of the last LED 631 in this LED unit 632 is connected to the cathode of a previous LED 631 and the cathode of the last LED 631 connected to the cathode of this LED unit 632.

It's noticeable that the LED module 630 may produce a current detection signal S531 reflecting the magnitude of current through the LED module 630 and being used for controlling or detecting the LED module 630.

Figure 32B:
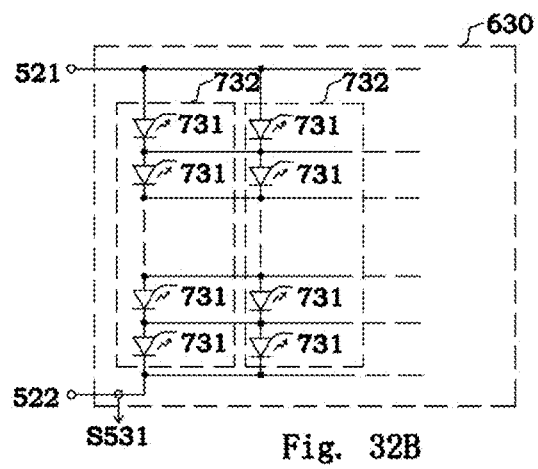
FIG. 32B is a schematic diagram of an LED module according to some embodiments.

FIG. 32B is a schematic diagram of an LED module according to an embodiment. Referring to FIG. 32B, an LED module 630 has an anode connected to a filtering output terminal 521, a cathode connected to a filtering output terminal 522, and includes at least two LED units 732 with the anode of each LED unit 732 connected to the anode of LED module 630 and the cathode of each LED unit 732 connected to the cathode of LED module 630. Each LED unit 732 includes at least two LEDs 731 connected in the same way as those described in FIG. 32A. For example, the anode of the first LED 731 in an LED unit 732 is connected to the anode of this LED unit 732, the cathode of the first LED 731 is connected to the anode of the next or second LED 731, and the cathode of the last LED 731 is connected to the cathode of this LED unit 732. Further, LED units 732 in an LED module 630 are connected to each other in this embodiment. All of the n-th LEDs 731 in the related LED units 732 thereof are connected by their anodes and cathodes, such as those shown in FIG. 32B but not limit to, where n is a positive integer. In this way, the LEDs in the LED module 630 of this embodiment are connected in the form of a mesh.

Compared to the embodiments of FIGS. 33A-F, the LED lighting module 530 in the above embodiments includes the LED module 630, but doesn't include a driving circuit for the LED module 630.

Also, the LED module 630 in this embodiment may produce a current detection signal S531 reflecting the magnitude of current through the LED module 630 and being used for controlling or detecting the LED module 630.

In certain embodiments, the number of LEDs 731 included by an LED unit 732 is in the range of 15-25. In some embodiments, the number of LEDs 731 included by an LED unit 732 is in the range of 18-22.

Figure 32C:
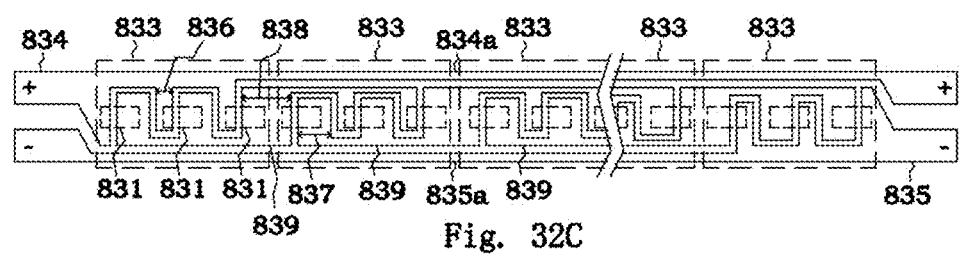
FIG. 32C is a plan view of a circuit layout of the LED module according to some embodiments.

FIG. 32C is a plan view of a circuit layout of the LED module according to an embodiment. Referring to FIG. 32C, in this embodiment, multiple LEDs 831 are connected in the same way as described in FIG. 32B, and three LED units are assumed in the LED module 630 and described as follows for illustration. A positive conductive line 834 and a negative conductive line 835 are to receive a driving signal for supplying power to the LEDs 831. For example, the positive conductive line 834 may be coupled to the filtering output terminal 521 of the filtering circuit 520 described above, and the negative conductive line 835 coupled to the filtering output terminal 522 of the filtering circuit 520 to receive a filtered signal. For the convenience of illustration, all three of the n-th LEDs 831 in the three related LED units thereof are grouped as an LED set 833 in FIG. 32C.

The positive conductive line 834 connects the three first LEDs 831 of the leftmost three related LED units thereof. For example, the positive conductive line 834 may connect the anodes on the left sides of the three first LEDs 831 as shown in the leftmost LED set 833 of FIG. 32C. The negative conductive line 835 connects the three last LEDs 831 of the rightmost three corresponding LED units thereof. For example, the negative conductive line 835 may connect the cathodes on the right sides of the three last LEDs 831 as shown in the rightmost LED set 833 of FIG. 32C. The cathodes of the three first LEDs 831, the anodes of the three last LEDs 831, and the anodes and cathodes of the remaining LEDs 831 are connected by conductive lines or parts 839.

For example, the anodes of the three LEDs 831 in the leftmost LED set 833 may be connected together by the positive conductive line 834, and their cathodes may be connected together by a leftmost conductive part 839. The anodes of the three LEDs 831 in the second leftmost LED set 833 are also connected together by the leftmost conductive part 839, whereas their cathodes are connected together by a second leftmost conductive part 839. Since the cathodes of the three LEDs 831 in the leftmost LED set 833 and the anodes of the three LEDs 831 in the second leftmost LED set 833 are connected together by the same leftmost conductive part 839, the cathode of the first LED 831 in each of the three LED units is connected to the anode of the next or second LED 831. As for the remaining LEDs 831 are also connected in the same way. Accordingly, the LEDs 831 of the three LED units are connected to form the mesh as shown in FIG. 32B.

It's worth noting that, in this embodiment, the length 836 of a portion of each conductive part 839 that connects to the anode of an LED 831 is smaller than the length 837 of another portion of each conductive part 839 that connects to the cathode of an LED 831. This makes the area of the latter portion connecting to the cathode larger than that of the former portion connecting to the anode. Moreover, the length 837 may be smaller than a length 838 of a portion of each conductive part 839 that connects the cathode of an LED 831 and the anode of the next LED 831 in two adjacent LED sets 833. This makes the area of the portion of each conductive part 839 that connects a cathode and an anode larger than the area of any other portion of each conductive part 839 that connects to only a cathode or an anode of an LED 831. Due to the length differences and area differences, this layout structure improves heat dissipation of the LEDs 831.

In some embodiments, the positive conductive line 834 includes a lengthwise portion 834a, and the negative conductive line 835 includes a lengthwise portion 835a, which are conducive to make the LED module have a positive "+" connective portion and a negative "−" connective portion at each of the two ends of the LED module, as shown in FIG. 32C. Such a layout structure allows for coupling any of other circuits of the power supply module of the LED lamp, including e.g. the filtering circuit 520 and the rectifying circuits 510 and 540, to the LED module through the positive connective portion and/or the negative connective portion at each or both ends of the LED lamp. Thus the layout structure increases the flexibility in arranging actual circuits in the LED lamp.

Figure 32D:
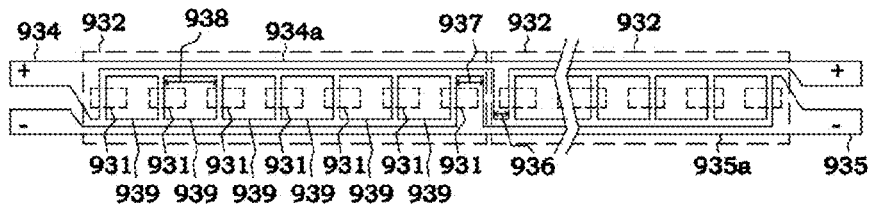
FIG. 32D is a plan view of a circuit layout of the LED module according to some embodiments.

FIG. 32D is a plan view of a circuit layout of the LED module according to another embodiment. Referring to FIG. 32D, in this embodiment, multiple LEDs 931 are connected in the same way as described in FIG. 32A, and three LED units each including 7 LEDs 931 are assumed in the LED module 630 and described as follows for illustration. A positive conductive line 934 and a negative conductive line 935 are to receive a driving signal for supplying power to the LEDs 931. For example, the positive conductive line 934 may be coupled to the filtering output terminal 521 of the filtering circuit 520 described above, and the negative conductive line 935 is coupled to the filtering output terminal 522 of the filtering circuit 520, so as to receive a filtered signal. For the convenience of illustration, all seven LEDs 931 of each of the three LED units are grouped as an LED set 932 in FIG. 32D. Thus there are three LED sets 932 corresponding to the three LED units.

The positive conductive line 934 connects the anode on the left side of the first or leftmost LED 931 of each of the three LED sets 932. The negative conductive line 935 connects the cathode on the right side of the last or rightmost LED 931 of each of the three LED sets 932. In each LED set 932 of each two adjacent LEDs 931, the LED 931 on the left has a cathode connected by a conductive part 939 to an anode of the LED 931 on the right. By such a layout, the LEDs 931 of each LED set 932 are connected in series.

It's also worth noting that the conductive part 939 may be used to connect an anode and a cathode of two consecutive LEDs 931 respectively. The negative conductive line 935 connects the cathode of the last or rightmost LED 931 of each of the three LED sets 932. And the positive conductive line 934 connects the anode of the first or leftmost LED 931 of each of the three LED sets 932. Therefore, as shown in FIG. 32D, the length of the conductive part 939 is larger than that of the portion of negative conductive line 935 connecting to a cathode, which length is then larger than that of the portion of positive conductive line 934 connecting to an anode. For example, the length 938 of the conductive part 939 may be larger than the length 937 of the portion of negative conductive line 935 connecting a cathode of an LED 931, which length 937 is then larger than the length 936 of the portion of the positive conductive line 934 connecting an anode of an LED 931. Such a layout structure improves heat dissipation of the LEDs 931 in LED module 630.

The positive conductive line 934 may include a lengthwise portion 934a, and the negative conductive line 935 may include a lengthwise portion 935a, which are conducive to make the LED module have a positive "+" connective portion and a negative "−" connective portion at each of the two ends of the LED module, as shown in FIG. 32D. Such a layout structure allows for coupling any of other circuits of the power supply module of the LED lamp, including e.g. the filtering circuit 520 and the rectifying circuits 510 and 540, to the LED module through the positive connective portion 934a and/or the negative connective portion 935a at each or both ends of the LED lamp. Thus the layout structure increases the flexibility in arranging actual circuits in the LED lamp.

Further, the circuit layouts as shown in FIGS. 32C and 32D may be implemented with a bendable circuit sheet or substrate, which may be called flexible circuit board depending on its specific definition used. For example, the bendable circuit sheet may comprise one conductive layer where the positive conductive line 834, the positive lengthwise portion 834a, the negative conductive line 835, the negative lengthwise portion 835a, and the conductive parts 839 shown in FIG. 32C, and the positive conductive line 934, the positive lengthwise portion 934a, the negative conductive line 935, the negative lengthwise portion 935a, and the conductive parts 939 shown in FIG. 32D are formed by the method of etching.

Figure 32E:
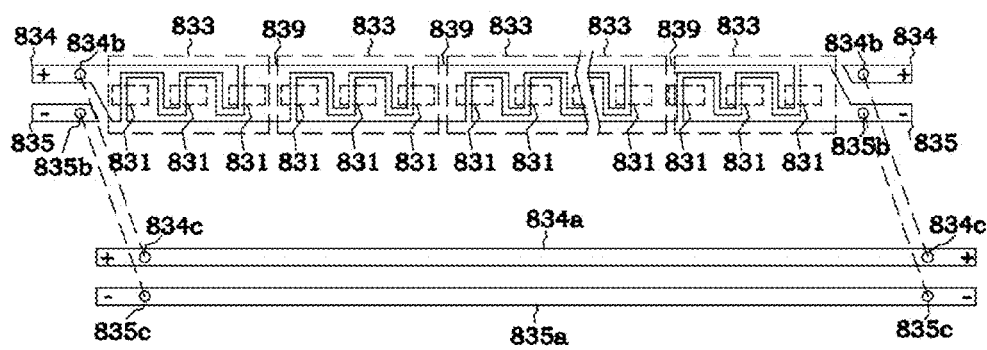
FIG. 32E is a plan view of a circuit layout of the LED module according to some embodiments.

FIG. 32E is a plan view of a circuit layout of the LED module according to another embodiment. The layout structures of the LED module in FIGS. 32E and 32C correspond to the same way of connecting the LEDs 831 as those shown in FIG. 32B, but the layout structure in FIG. 32E comprises two conductive layers instead of only one conductive layer for forming the circuit layout as shown in FIG. 32C. Referring to FIG. 32E, the main difference from the layout in FIG. 32C is that the positive conductive line 834 and the negative conductive line 835 have a lengthwise portion 834a and a lengthwise portion 835a, respectively, that are formed in a second conductive layer instead. The difference is elaborated as follows.

Referring to FIG. 32E, the positive conductive line 834, the negative conductive line 835, and the conductive parts 839 in FIG. 32E are formed in first conductive layer by the method of etching for electrically connecting the plurality of LED components 831 e.g. in a form of a mesh, whereas the positive lengthwise portion 834a and the negative lengthwise portion 835a are formed in second conductive layer by etching for electrically connecting (the filtering output terminal of) the filtering circuit. Further, the positive conductive line 834 and the negative conductive line 835 in the first conductive layer have via points 834b and via points 835b, respectively, for connecting to second conductive layer. And the positive lengthwise portion 834a and the negative lengthwise portion 835a in second conductive layer have via points 834c and via points 835c, respectively. The via points 834b are positioned corresponding to the via points 834c, for connecting the positive conductive line 834 and the positive lengthwise portion 834a. The via points 835b are positioned corresponding to the via points 835c, for connecting the negative conductive line 835 and the negative lengthwise portion 835a. In some embodiments, the two conductive layers may be connected by forming a hole connecting each via point 834b and a corresponding via point 834c, and forming a hole connecting each via point 835b and a corresponding via point 835c, with the holes extending through the two conductive layers and the dielectric layer in-between. And the positive conductive line 834 and the positive lengthwise portion 834a can be electrically connected by welding metallic part(s) through the connecting hole(s), and the negative conductive line 835 and the negative lengthwise portion 835a can be electrically connected by welding metallic part(s) through the connecting hole(s).

Similarly, the layout structure of the LED module in FIG. 32D may alternatively have the positive lengthwise portion 934a and the negative lengthwise portion 935a disposed in a second conductive layer to constitute a two-layered layout structure.

It's worth noting that the thickness of the second conductive layer of a two-layered bendable circuit sheet is, in some embodiments, larger than that of the first conductive layer in order to reduce the voltage drop or loss along each of the positive lengthwise portion and the negative lengthwise portion disposed in the second conductive layer. Compared to a one-layered bendable circuit sheet, since a positive lengthwise portion and a negative lengthwise portion are disposed in a second conductive layer in a two-layer bendable circuit sheet, the width (between two lengthwise sides) of the two-layered bendable circuit sheet is or can be reduced. On the same fixture or plate in a production process, the number of bendable circuit sheets each with a shorter width that can be laid together at most is larger than the number of bendable circuit sheets each with a longer width that can be laid together at most. Thus adopting a bendable circuit sheet with a shorter width can increase the efficiency of production of the LED module. And reliability in the production process, such as the accuracy of welding position when welding (materials on) the LED components, can also be improved, because a two-layer bendable circuit sheet can better maintain its shape.

As a variant of the above embodiments, a type of LED tube lamp is provided that has at least some of the electronic components of its power supply module disposed on a light strip of the LED tube lamp. For example, the technique of printed electronic circuit (PEC) can be used to print, insert, or embed at least some of the electronic components onto the light strip.

In one embodiment, all electronic components of the power supply module are disposed on the light strip. The production process may include or proceed with the following steps: preparation of the circuit substrate (e.g. preparation of a flexible printed circuit board); ink jet printing of metallic nano-ink; ink jet printing of active and passive components (as of the power supply module); drying/sintering; ink jet printing of interlayer bumps; spraying of insulating ink; ink jet printing of metallic nano-ink; ink jet printing of active and passive components (to sequentially form the included layers); spraying of surface bond pad(s); and spraying of solder resist against LED components.

In certain embodiments, if all electronic components of the power supply module are disposed on the LED light strip, electrical connection between the terminal pins of the LED tube lamp and the light strip may be achieved by connecting the pins to conductive lines which are welded with ends of the light strip. In this case, another substrate for supporting the power supply module is not required, thereby allowing of an improved design or arrangement in the end cap(s) of the LED tube lamp. In some embodiments, (components of) the power supply module are disposed at two ends of the light strip, in order to significantly reduce the impact of heat generated from the power supply module's operations on the LED components. Since no substrate other than the light strip is used to support the power supply module in this case, the total amount of welding or soldering can be significantly reduced, improving the general reliability of the power supply module.

Another case is that some of all electronic components of the power supply module, such as some resistors and/or smaller size capacitors, are printed onto the light strip, and some bigger size components, such as some inductors and/or electrolytic capacitors, are disposed in the end cap(s). The production process of the light strip in this case may be the same as that described above. And in this case disposing some of all electronic components on the light strip is conducive to achieving a reasonable layout of the power supply module in the LED tube lamp, which may allow of an improved design in the end cap(s).

As a variant embodiment of the above, electronic components of the power supply module may be disposed on the LED light strip by a method of embedding or inserting, e.g. by embedding the components onto a bendable or flexible light strip. In some embodiments, this embedding may be realized by a method using copper-clad laminates (CCL) for forming a resistor or capacitor; a method using ink related to silkscreen printing; or a method of ink jet printing to embed passive components, wherein an ink jet printer is used to directly print inks to constitute passive components and related functionalities to intended positions on the light strip. Then through treatment by ultraviolet (UV) light or drying/sintering, the light strip is formed where passive components are embedded. The electronic components embedded onto the light strip include for example resistors, capacitors, and inductors. In other embodiments, active components also may be embedded. Through embedding some components onto the light strip, a reasonable layout of the power supply module can be achieved to allow of an improved design in the end cap(s), because the surface area on a printed circuit board used for carrying components of the power supply module is reduced or smaller, and as a result the size, weight, and thickness of the resulting printed circuit board for carrying components of the power supply module is also smaller or reduced. Also in this situation since welding points on the printed circuit board for welding resistors and/or capacitors if they were not to be disposed on the light strip are no longer used, the reliability of the power supply module is improved, in view of the fact that these welding points are most liable to (cause or incur) faults, malfunctions, or failures. Further, the length of conductive lines needed for connecting components on the printed circuit board is therefore also reduced, which allows of a more compact layout of components on the printed circuit board and thus improving the functionalities of these components.

Next, methods to produce embedded capacitors and resistors are explained as follows.

Usually, methods for manufacturing embedded capacitors employ or involve a concept called distributed or planar capacitance. The manufacturing process may include the following step(s). On a substrate of a copper layer a very thin insulation layer is applied or pressed, which is then generally disposed between a pair of layers including a power conductive layer and a ground layer. The very thin insulation layer makes the distance between the power conductive layer and the ground layer very short. A capacitance resulting from this structure can also be realized by a conventional technique of a plated-through hole. Basically, this step is used to create this structure comprising a big parallel-plate capacitor on a circuit substrate.

Of products of high electrical capacity, certain types of products employ distributed capacitances, and other types of products employ separate embedded capacitances. Through putting or adding a high dielectric-constant material, such as barium titanate, into the insulation layer, the high electrical capacity is achieved.

A usual method for manufacturing embedded resistors employ conductive or resistive adhesive. This may include, for example, a resin to which conductive carbon or graphite is added, which may be used as an additive or filler. The additive resin is silkscreen printed to an object location, and is then after treatment laminated inside the circuit board. The resulting resistor is connected to other electronic components through plated-through holes or microvias. Another method is called Ohmega-Ply, by which a two metallic layer structure of a copper layer and a thin nickel alloy layer constitutes a layer resistor relative to a substrate. Then through etching the copper layer and nickel alloy layer, different types of nickel alloy resistors with copper terminals can be formed. These types of resistor are each laminated inside the circuit board.

In an embodiment, conductive wires/lines are directly printed in a linear layout on an inner surface of the LED glass lamp tube, with LED components directly attached on the inner surface and electrically connected by the conductive wires. In some embodiments, the LED components in the form of chips are directly attached over the conductive wires on the inner surface, and connective points are at terminals of the wires for connecting the LED components and the power supply module. After being attached, the LED chips may have fluorescent powder applied or dropped thereon, for producing white light or light of other color by the operating LED tube lamp.

In some embodiments, luminous efficacy of the LED or LED component is 80 lm/W or above. In certain embodiments, luminous efficacy of the LED or LED component may be 120 lm/W or above. In still other embodiments, luminous efficacy of the LED or LED component may be 160 lm/W or above. In certain exemplary embodiments, white light emitted by an LED component may be produced by mixing fluorescent powder with the monochromatic light emitted by a monochromatic LED chip. The white light in its spectrum has major wavelength ranges of 430-460 nm and 550-560 nm, or major wavelength ranges of 430-460 nm, 540-560 nm, and 620-640 nm.

Figure 33A:
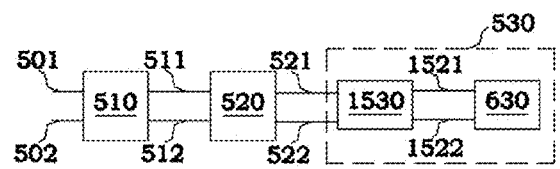
FIG. 33A is a block diagram of an exemplary power supply module in an LED lamp according to some embodiments.

FIG. 33A is a block diagram of a power supply module in an LED lamp according to an embodiment. As shown in FIG. 33A, the power supply module of the LED lamp includes a rectifying circuit 510, a filtering circuit 520, and may further include some parts of an LED lighting module 530. The LED lighting module 530 in this embodiment comprises a driving circuit 1530 and an LED module 630. The driving circuit 1530 comprises a DC-to-DC converter circuit, and is coupled to the filtering output terminals 521 and 522 to receive a filtered signal and then perform power conversion for converting the filtered signal into a driving signal at the driving output terminals 1521 and 1522. The LED module 630 is coupled to the driving output terminals 1521 and 1522 to receive the driving signal for emitting light. In some embodiments, the current of LED module 630 is stabilized at an objective current value. Descriptions of this LED module 630 are the same as those provided above with reference to FIGS. 32A-D.

In some embodiments, the LED lighting module 530 shown in FIG. 29B may include the driving circuit 1530 and the LED module 630. Thus, the power supply module for the LED lamp in the present embodiment can be applied to the single-end power supply structure, such as LED light bulbs, personal area lights (PAL), and so forth.

Figure 33B:
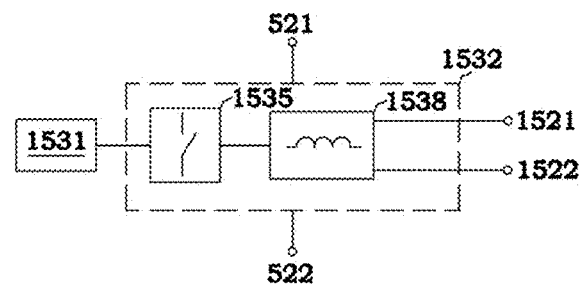
FIG. 33B is a block diagram of a driving circuit according to some embodiments.

FIG. 33B is a block diagram of the driving circuit according to an embodiment. Referring to FIG. 33B, a driving circuit includes a controller 1531, and a conversion circuit 1532 for power conversion based on a current source, for driving the LED module to emit light. The conversion circuit 1532 includes a switching circuit 1535 and an energy storage circuit 1538. And the conversion circuit 1532 is coupled to the filtering output terminals 521 and 522 to receive and then convert a filtered signal, under the control by the controller 1531, into a driving signal at the driving output terminals 1521 and 1522 for driving the LED module. Under the control by the controller 1531, the driving signal output by the conversion circuit 1532 comprises a steady current, making the LED module emitting steady light.

Figure 33C:
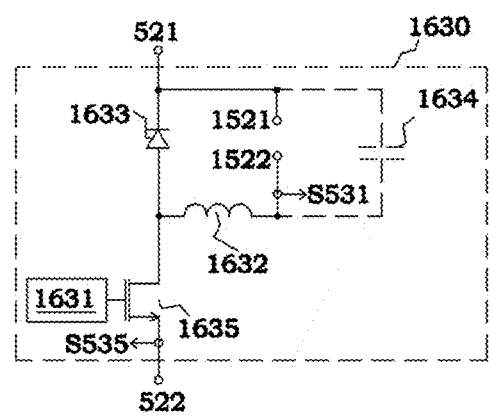
FIG. 33C is a schematic diagram of a driving circuit according to some embodiments.

FIG. 33C is a schematic diagram of the driving circuit according to an embodiment. Referring to FIG. 33C, a driving circuit 1630 in this embodiment comprises a buck DC-to-DC converter circuit having a controller 1631 and a converter circuit. The converter circuit includes an inductor 1632, a diode 1633 for "freewheeling" of current, a capacitor 1634, and a switch 1635. The driving circuit 1630 is coupled to the filtering output terminals 521 and 522 to receive and then convert a filtered signal into a driving signal for driving an LED module connected between the driving output terminals 1521 and 1522.

In this embodiment, the switch 1635 comprises a metal-oxide-semiconductor field-effect transistor (MOSFET) and has a first terminal coupled to the anode of freewheeling diode 1633, a second terminal coupled to the filtering output terminal 522, and a control terminal coupled to the controller 1631 used for controlling current conduction or cutoff between the first and second terminals of switch 1635. The driving output terminal 1521 is connected to the filtering output terminal 521, and the driving output terminal 1522 is connected to an end of the inductor 1632, which has another end connected to the first terminal of switch 1635. The capacitor 1634 is coupled between the driving output terminals 1521 and 1522 to stabilize the voltage between the driving output terminals 1521 and 1522. The freewheeling diode 1633 has a cathode connected to the driving output terminal 1521.

Next, a description follows as to an exemplary operation of the driving circuit 1630.

The controller 1631 is configured for determining when to turn the switch 1635 on (in a conducting state) or off (in a cutoff state) according to a current detection signal S535 and/or a current detection signal S531. For example, in some embodiments, the controller 1631 is configured to control the duty cycle of switch 1635 being on and switch 1635 being off in order to adjust the size or magnitude of the driving signal. The current detection signal S535 represents the magnitude of current through the switch 1635. The current detection signal S531 represents the magnitude of current through the LED module coupled between the driving output terminals 1521 and 1522. According to any of current detection signal S535 and current detection signal S531, the controller 1631 can obtain information on the magnitude of power converted by the converter circuit. When the switch 1635 is switched on, a current of a filtered signal is input through the filtering output terminal 521, and then flows through the capacitor 1634, the driving output terminal 1521, the LED module, the inductor 1632, and the switch 1635, and then flows out from the filtering output terminal 522. During this flowing of current, the capacitor 1634 and the inductor 1632 are performing storing of energy. On the other hand, when the switch 1635 is switched off, the capacitor 1634 and the inductor 1632 perform releasing of stored energy by a current flowing from the freewheeling diode 1633 to the driving output terminal 1521 to make the LED module continuing to emit light.

It's worth noting that the capacitor 1634 is an optional element, so it can be omitted and is thus depicted in a dotted line in FIG. 33C. In some application environments, the natural characteristic of an inductor to oppose instantaneous change in electric current passing through the inductor may be used to achieve the effect of stabilizing the current through the LED module, thus omitting the capacitor 1634.

From another aspect, the driving circuit 1630 makes the current of LED module remain stable, thus the color temperature may not change with current to some LED module, such as white, red, blue, green LED modules. For example, LED can retain the same color temperature under different illumination. In some embodiments, the inductor 1632 playing the role of the energy-storing circuit releases the stored power when the switch 1635 cuts off, and this is for making the LED module keeping lighting and also keeping the voltage/current on the LED module being not likely to go the minimum value. In this way, when the switch 1635 conducts again, the voltage/current is unnecessary to go from the minimum value to the maximum value. Accordingly, the LED module lighting with flickering can be avoided, the entire illumination can be improved, the lowest conducting period can be smaller, and the driving frequency can be higher.

Figure 33D:
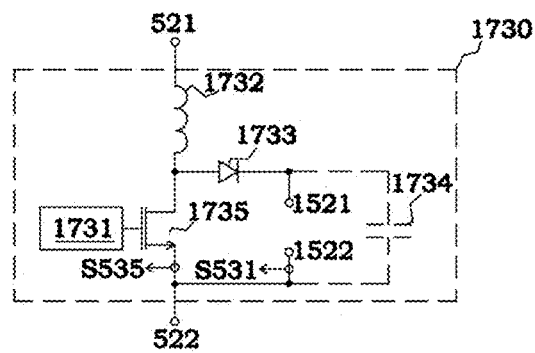
FIG. 33D is a schematic diagram of a driving circuit according to some embodiments.

FIG. 33D is a schematic diagram of the driving circuit according to an embodiment. Referring to FIG. 33D, a driving circuit 1730 in this embodiment comprises a boost DC-to-DC converter circuit having a controller 1731 and a converter circuit. The converter circuit includes an inductor 1732, a diode 1733 for "freewheeling" of current, a capacitor 1734, and a switch 1735. The driving circuit 1730 is configured to receive and then convert a filtered signal from the filtering output terminals 521 and 522 into a driving signal for driving an LED module coupled between the driving output terminals 1521 and 1522.

The inductor 1732 has an end connected to the filtering output terminal 521, and another end connected to the anode of freewheeling diode 1733 and a first terminal of the switch 1735, which has a second terminal connected to the filtering output terminal 522 and the driving output terminal 1522. The freewheeling diode 1733 has a cathode connected to the driving output terminal 1521. And the capacitor 1734 is coupled between the driving output terminals 1521 and 1522.

The controller 1731 is coupled to a control terminal of switch 1735, and is configured for determining when to turn the switch 1735 on (in a conducting state) or off (in a cutoff state), according to a current detection signal S535 and/or a current detection signal S531. When the switch 1735 is switched on, a current of a filtered signal is input through the filtering output terminal 521, and then flows through the inductor 1732 and the switch 1735, and then flows out from the filtering output terminal 522. During this flowing of current, the current through the inductor 1732 increases with time, with the inductor 1732 being in a state of storing energy, while the capacitor 1734 enters a state of releasing energy, making the LED module continuing to emit light. On the other hand, when the switch 1735 is switched off, the inductor 1732 enters a state of releasing energy as the current through the inductor 1732 decreases with time. In this state, the current through the inductor 1732 then flows through the freewheeling diode 1733, the capacitor 1734, and the LED module, while the capacitor 1734 enters a state of storing energy.

It's worth noting that the capacitor 1734 is an optional element, so it can be omitted and is thus depicted in a dotted line in FIG. 33D. When the capacitor 1734 is omitted and the switch 1735 is switched on, the current of inductor 1732 does not flow through the LED module, making the LED module not emit light; but when the switch 1735 is switched off, the current of inductor 1732 flows through the freewheeling diode 1733 to reach the LED module, making the LED module emit light. Therefore, by controlling the time that the LED module emits light, and the magnitude of current through the LED module, the average luminance of the LED module can be stabilized to be above a defined value, thus also achieving the effect of emitting a steady light.

From another aspect, the driving circuit 1730 makes the current of LED module remain stable, thus the color temperature may not change with current to some LED module, such as white, red, blue, green LED modules. For example, LED can retain the same color temperature under different illumination. In some embodiments, the inductor 1732 playing the role of the energy-storing circuit releases the stored power when the switch 1735 cuts off, and this is for making the LED module keeping lighting and also keeping the voltage/current on the LED module being not likely to go the minimum value. In this way, when the switch 1735 conducts again, the voltage/current is unnecessary to go from the minimum value to the maximum value. Accordingly, the LED module lighting with flickering can be avoided, the entire illumination can be improved, the lowest conducting period can be smaller, and the driving frequency can be higher.

Figure 33E:
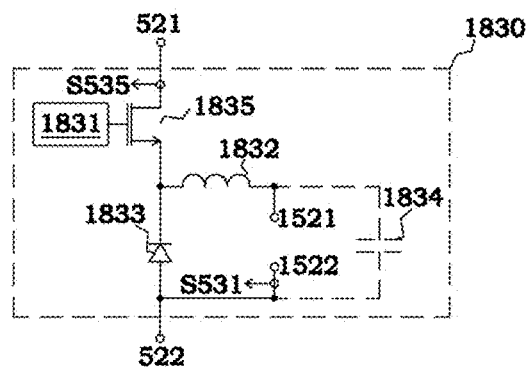
FIG. 33E is a schematic diagram of a driving circuit according to some embodiments.

FIG. 33E is a schematic diagram of the driving circuit according to an embodiment. Referring to FIG. 33E, a driving circuit 1830 in this embodiment comprises a buck DC-to-DC converter circuit having a controller 1831 and a converter circuit. The converter circuit includes an inductor 1832, a diode 1833 for "freewheeling" of current, a capacitor 1834, and a switch 1835. The driving circuit 1830 is coupled to the filtering output terminals 521 and 522 to receive and then convert a filtered signal into a driving signal for driving an LED module connected between the driving output terminals 1521 and 1522.

The switch 1835 has a first terminal coupled to the filtering output terminal 521, a second terminal coupled to the cathode of freewheeling diode 1833, and a control terminal coupled to the controller 1831 to receive a control signal from the controller 1831 for controlling current conduction or cutoff between the first and second terminals of the switch 1835. The anode of freewheeling diode 1833 is connected to the filtering output terminal 522 and the driving output terminal 1522. The inductor 1832 has an end connected to the second terminal of switch 1835, and another end connected to the driving output terminal 1521. The capacitor 1834 is coupled between the driving output terminals 1521 and 1522 to stabilize the voltage between the driving output terminals 1521 and 1522.

The controller 1831 is configured for controlling when to turn the switch 1835 on (in a conducting state) or off (in a cutoff state) according to a current detection signal S535 and/or a current detection signal S531. When the switch 1835 is switched on, a current of a filtered signal is input through the filtering output terminal 521, and then flows through the switch 1835, the inductor 1832, and the driving output terminals 1521 and 1522, and then flows out from the filtering output terminal 522. During this flowing of current, the current through the inductor 1832 and the voltage of the capacitor 1834 both increase with time, so the inductor 1832 and the capacitor 1834 are in a state of storing energy. On the other hand, when the switch 1835 is switched off, the inductor 1832 is in a state of releasing energy and thus the current through it decreases with time. In this case, the current through the inductor 1832 circulates through the driving output terminals 1521 and 1522, the freewheeling diode 1833, and back to the inductor 1832.

It's worth noting that the capacitor 1834 is an optional element, so it can be omitted and is thus depicted in a dotted line in FIG. 33E. When the capacitor 1834 is omitted, no matter whether the switch 1835 is turned on or off, the current through the inductor 1832 will flow through the driving output terminals 1521 and 1522 to drive the LED module to continue emitting light.

From another aspect, the driving circuit 1830 makes the current of LED module remain stable, thus the color temperature may not change with current to some LED module, such as white, red, blue, green LED modules. For example, LED can retain the same color temperature under different illumination. In some embodiments, the inductor 1832 playing the role of the energy-storing circuit releases the stored power when the switch 1835 cuts off, and this is for making the LED module keeping lighting and also keeping the voltage/current on the LED module being not likely to go the minimum value. In this way, when the switch 1835 conducts again, the voltage/current is unnecessary to go from the minimum value to the maximum value. Accordingly, the LED module lighting with flickering can be avoided, the entire illumination can be improved, the lowest conducting period can be smaller, and the driving frequency can be higher.

Figure 33F:
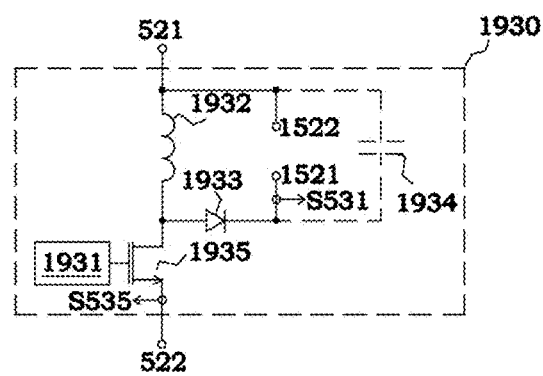
FIG. 33F is a schematic diagram of a driving circuit according to some embodiments.

FIG. 33F is a schematic diagram of the driving circuit according to an embodiment. Referring to FIG. 33F, a driving circuit 1930 in this embodiment comprises a buck DC-to-DC converter circuit having a controller 1931 and a converter circuit. The converter circuit includes an inductor 1932, a diode 1933 for "freewheeling" of current, a capacitor 1934, and a switch 1935. The driving circuit 1930 is coupled to the filtering output terminals 521 and 522 to receive and then convert a filtered signal into a driving signal for driving an LED module connected between the driving output terminals 1521 and 1522.

The inductor 1932 has an end connected to the filtering output terminal 521 and the driving output terminal 1522, and another end connected to a first end of the switch 1935. The switch 1935 has a second end connected to the filtering output terminal 522, and a control terminal connected to controller 1931 to receive a control signal from controller 1931 for controlling current conduction or cutoff of the switch 1935. The freewheeling diode 1933 has an anode coupled to a node connecting the inductor 1932 and the switch 1935, and a cathode coupled to the driving output terminal 1521. The capacitor 1934 is coupled to the driving output terminals 1521 and 1522 to stabilize the driving of the LED module coupled between the driving output terminals 1521 and 1522.

The controller 1931 is configured for controlling when to turn the switch 1935 on (in a conducting state) or off (in a cutoff state) according to a current detection signal S531 and/or a current detection signal S535. When the switch 1935 is turned on, a current is input through the filtering output terminal 521, and then flows through the inductor 1932 and the switch 1935, and then flows out from the filtering output terminal 522. During this flowing of current, the current through the inductor 1932 increases with time, so the inductor 1932 is in a state of storing energy; but the voltage of the capacitor 1934 decreases with time, so the capacitor 1934 is in a state of releasing energy to keep the LED module continuing to emit light. On the other hand, when the switch 1935 is turned off, the inductor 1932 is in a state of releasing energy and its current decreases with time. In this case, the current through the inductor 1932 circulates through the freewheeling diode 1933, the driving output terminals 1521 and 1522, and back to the inductor 1932. During this circulation, the capacitor 1934 is in a state of storing energy and its voltage increases with time.

It's worth noting that the capacitor 1934 is an optional element, so it can be omitted and is thus depicted in a dotted line in FIG. 33F. When the capacitor 1934 is omitted and the switch 1935 is turned on, the current through the inductor 1932 doesn't flow through the driving output terminals 1521 and 1522, thereby making the LED module not emit light. On the other hand, when the switch 1935 is turned off, the current through the inductor 1932 flows through the freewheeling diode 1933 and then the LED module to make the LED module emit light. Therefore, by controlling the time that the LED module emits light, and the magnitude of current through the LED module, the average luminance of the LED module can be stabilized to be above a defined value, thus also achieving the effect of emitting a steady light.

From another aspect, the driving circuit 1930 makes the current of LED module remain stable, thus the color temperature may not change with current to some LED module, such as white, red, blue, green LED modules. For example, LED can retain the same color temperature under different illumination. In some embodiments, the inductor 1932 playing the role of the energy-storing circuit releases the stored power when the switch 1935 cuts off, and this is for making the LED module keeping lighting and also keeping the voltage/current on the LED module being not likely to go the minimum value. In this way, when the switch 1935 conducts again, the voltage/current is unnecessary to go from the minimum value to the maximum value. Accordingly, the LED module lighting with flickering can be avoided, the entire illumination can be improved, the lowest conducting period can be smaller, and the driving frequency can be higher.

In certain exemplary embodiments, the conversion efficiency of the driving circuits is above 80%. In some embodiments, the conversion efficiency of the driving circuits is above 90%. In still other embodiments, the conversion efficiency of the driving circuits is above 92%. The illumination efficiency of the LED lamps is above 120 lm/W. In some embodiments, the illumination efficiency of the LED lamps is above 160 lm/W. The illumination efficiency including the combination of the driving circuits and the LED modules is above 120 lm/W*90%=108 lm/W. In some embodiments, the illumination efficiency including the combination of the driving circuits and the LED modules is above 160 lm/W*92%=147.21 lm/W.

In some embodiments, the transmittance of the diffusion film in the LED tube lamp is above 85%. As a result, in certain embodiments, the illumination efficiency of the LED lamps is above 108 lm/W*85%=91.8 lm/W. In some embodiments, the illumination efficiency of the LED lamps is above 147.21 lm/W*85%=125.121 m/W.

Figure 34A:
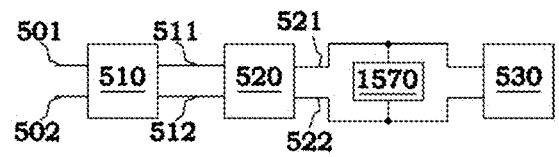
FIG. 34A is a block diagram of an exemplary power supply module in an LED tube lamp according to some embodiments.

FIG. 34A is a block diagram of a power supply module in an LED tube lamp according to an embodiment. Compared to that shown in FIG. 29B, the present embodiment comprises a rectifying circuit 510, a filtering circuit 520, and a driving circuit 1530, and further comprises an over voltage protection (OVP) circuit 1570. In this embodiment, a driving circuit 1530 and an LED module 630 compose the LED lighting module 530. The OVP circuit 1570 is coupled to the filtering output terminals 521 and 522 for detecting the filtered signal. The OVP circuit 1570 clamps the logic level of the filtered signal when determining the logic level thereof higher than a defined OVP value. Hence, the OVP circuit 1570 protects the LED lighting module 530 from damage due to an OVP condition.

Figure 34B:
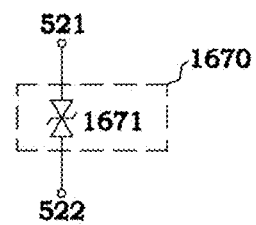
FIG. 34B is a schematic diagram of an OVP circuit according to an embodiment.

FIG. 34B is a schematic diagram of an overvoltage protection (OVP) circuit according to an embodiment. An OVP circuit 1670 comprises a voltage clamping diode 1671, such as zener diode, coupled to the filtering output terminals 521 and 522. The voltage clamping diode 1671 is conducted to clamp a voltage difference at a breakdown voltage when the voltage difference of the filtering output terminals 521 and 522 (i.e., the logic level of the filtered signal) reaches the breakdown voltage. In some embodiments, the breakdown voltage may be in a range of about 40 V to about 100 V. In certain embodiments, the breakdown voltage may be in a range of about 55 V to about 75V.

Figure 35A:
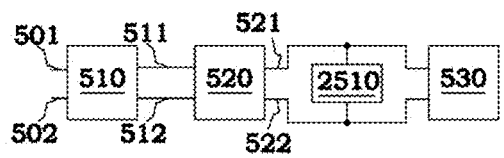
FIG. 35A is a block diagram of an exemplary power supply module in an LED tube lamp according to some embodiments.

FIG. 35A is a block diagram of a power supply module in an LED tube lamp according to an embodiment. Compared to that shown in FIG. 35A, the present embodiment comprises two rectifying circuits 510 and 540, a filtering circuit 520, and a driving circuit 1530, and further comprises an auxiliary power module 2510. The auxiliary power module 2510 is coupled between the filtering output terminals 521 and 522. The auxiliary power module 2510 detects the filtered signal in the filtering output terminals 521 and 522, and determines whether providing an auxiliary power to the filtering output terminals 521 and 522 based on the detected result. When the supply of the filtered signal is stopped or a logic level thereof is insufficient, i.e., when a drive voltage for the LED module is below a defined voltage, the auxiliary power module provides auxiliary power to keep the LED lighting module 530 continuing to emit light. The defined voltage is determined according to an auxiliary power voltage of the auxiliary power module 2510.

Figure 35B:
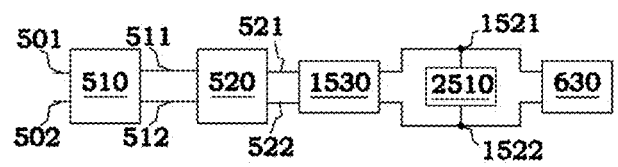
FIG. 35B is a block diagram of an exemplary power supply module in an LED tube lamp according to some embodiments.

FIG. 35B is a block diagram of a power supply module in an LED tube lamp according to an embodiment. Compared to that shown in FIG. 35A, the present embodiment comprises two rectifying circuits 510 and 540, a filtering circuit 520, and may further include some parts of an LED lighting module 530, and an auxiliary power module 2510, and the LED lighting module 530 further comprises a driving circuit 1530 and an LED module 630. The auxiliary power module 2510 is coupled between the driving output terminals 1521 and 1522. The auxiliary power module 2510 detects the driving signal in the driving output terminals 1521 and 1522, and determines whether to provide an auxiliary power to the driving output terminals 1521 and 1522 based on the detected result. When the driving signal is no longer being supplied or a logic level thereof is insufficient, the auxiliary power module 2510 provides the auxiliary power to keep the LED module 630 continuously light.

Figure 35C:
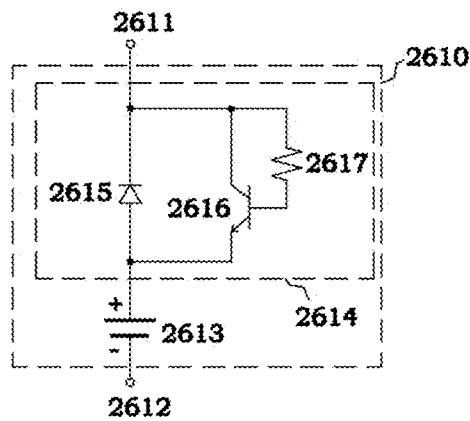
FIG. 35C is a schematic diagram of an auxiliary power module according to an embodiment.

FIG. 35C is a schematic diagram of an auxiliary power module according to an embodiment. The auxiliary power module 2610 comprises an energy storage unit 2613 and a voltage detection circuit 2614. The auxiliary power module further comprises an auxiliary power positive terminal 2611 and an auxiliary power negative terminal 2612 for being respectively coupled to the filtering output terminals 521 and 522 or the driving output terminals 1521 and 1522. The voltage detection circuit 2614 detects a logic level of a signal at the auxiliary power positive terminal 2611 and the auxiliary power negative terminal 2612 to determine whether releasing outward the power of the energy storage unit 2613 through the auxiliary power positive terminal 2611 and the auxiliary power negative terminal 2612.

In the present embodiment, the energy storage unit 2613 is a battery or a supercapacitor. When a voltage difference of the auxiliary power positive terminal 2611 and the auxiliary power negative terminal 2612 (the drive voltage for the LED module) is higher than the auxiliary power voltage of the energy storage unit 2613, the voltage detection circuit 2614 charges the energy storage unit 2613 by the signal in the auxiliary power positive terminal 2611 and the auxiliary power negative terminal 2612. When the drive voltage is lower than the auxiliary power voltage, the energy storage unit 2613 releases the stored energy outward through the auxiliary power positive terminal 2611 and the auxiliary power negative terminal 2612.

The voltage detection circuit 2614 comprises a diode 2615, a bipolar junction transistor (BJT) 2616 and a resistor 2617. A positive end of the diode 2615 is coupled to a positive end of the energy storage unit 2613 and a negative end of the diode 2615 is coupled to the auxiliary power positive terminal 2611. The negative end of the energy storage unit 2613 is coupled to the auxiliary power negative terminal 2612. A collector of the BJT 2616 is coupled to the auxiliary power positive terminal 2611, and an emitter thereof is coupled to the positive end of the energy storage unit 2613. One end of the resistor 2617 is coupled to the auxiliary power positive terminal 2611 and the other end is coupled to a base of the BJT 2616. When the collector of the BJT 2616 is a cut-in voltage higher than the emitter thereof, the resistor 2617 conducts the BJT 2616. When the power source provides power to the LED tube lamp normally, the energy storage unit 2613 is charged by the filtered signal through the filtering output terminals 521 and 522 and the conducted BJT 2616 or by the driving signal through the driving output terminals 1521 and 1522 and the conducted BJT 2616 until that the collector-emitter voltage of the BJT 2616 is lower than or equal to the cut-in voltage. When the filtered signal or the driving signal is no longer being supplied or the logic level thereof is insufficient, the energy storage unit 2613 provides power through the diode 2615 to keep the LED lighting module 530 or the LED module 630 continuously light.

It is worth noting that in some embodiments, the maximum voltage of the charged energy storage unit 2613 is at least one cut-in voltage of the BJT 2616 lower than the voltage difference applied between the auxiliary power positive terminal 2611 and the auxiliary power negative terminal 2612. The voltage difference provided between the auxiliary power positive terminal 2611 and the auxiliary power negative terminal 2612 is a turn-on voltage of the diode 2615 lower than the voltage of the energy storage unit 2613. Hence, when the auxiliary power module 2610 provides power, the voltage applied at the LED module 630 is lower (about the sum of the cut-in voltage of the BJT 2616 and the turn-on voltage of the diode 2615). In the embodiment shown in the FIG. 35B, the brightness of the LED module 630 is reduced when the auxiliary power module supplies power thereto. Thereby, when the auxiliary power module is applied to an emergency lighting system or a constant lighting system, the user realizes the main power supply, such as commercial power, is abnormal and then performs precautions therefore.

Figure 36:
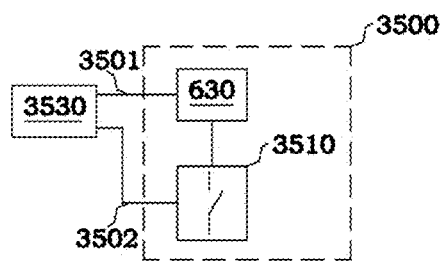
FIG. 36 is a block diagram of an exemplary power supply module in an LED tube lamp according to some embodiments.

FIG. 36 is a block diagram of a power supply module in an LED tube lamp according to an embodiment. Compared to the above mentioned embodiments, the circuits for driving the LED module is installed outside of the LED tube lamp. For example, the LED tube lamp 3500 is driven to emit light by an external driving power 3530 through external driving terminals 3501 and 3502. The LED tube lamp 3500 comprises the LED module 630 and a current control circuit 3510, and does not comprise the rectifying circuit, filtering circuit and the driving circuit. In the present embodiment, the external driving terminals 3501 and 3502 serve as the pins 501 and 502 shown in FIG. 29A.

The external driving power 3530 may be directly connected with the commercial power or the ballast for receiving power and converting into an external driving signal to input into the LED tube lamp 3500 through the external driving terminals 3501 and 3502. The external driving signal may be a DC signal. In some embodiments, external driving signal may be a stable DC current signal. Under a normal condition, the current control circuit 3510 conducts to have a current flowing through and driving the LED module 630 to emit light. The current control circuit 3510 may further detect the current of the LED module 630 for performing a steady current or voltage control, and have a function of ripple filter. Under an abnormal condition, the current control circuit 3510 is cut off to stop inputting the power of the external driving power 3530 into the LED module 630 and enters into a protection state.

When the current control circuit 3510 determines that the current of the LED module 630 is lower than a defined current or a minimum current of a defined current range, the current control circuit 3510 is completely conducted, i.e., the impedance of the current control circuit 3510 comes down a minimum value.

When the current control circuit 3510 determines that the current of the LED module 630 is higher than a defined current or a maximum current of a defined current range, the current control circuit 3510 is cutoff to stop inputting power into the LED tube lamp 3500. The maximum current of a defined current range is in some embodiments set at a value about 30% higher than a rated current of the LED module 630. Thereby, the current control circuit 3510 can keep the brightness of the LED lamp as much as possible when a driving capability of the external driving power 3530 is reduced. Furthermore, the current control circuit 3510 can prevent the LED module 630 from over current when the driving capability of the external driving power 3530 is abnormally increased. Hence, the current control circuit 3510 has a function of over-current protection.

It is worth noting that the external driving power 3530 may be a DC voltage signal. Under a normal condition, the current control circuit 3510 stabilizes the current of the LED module 630 or controls the current linearly, e.g, the current of the LED module 630 is varied linearly with a level of the DC voltage signal. For controlling the current of the LED module at a current value or linearly, a voltage cross the current control circuit 3510 is increased with the level of the DC voltage signal provided by the external driving power 3530 and a power consumption thereof is also increased. The current control circuit 3510 may have a temperature detector. When the level of the DC voltage signal provided by the external driving power 3530 is over a high threshold, the current control circuit 3510 enters into a state of over temperature protection to stop inputting power of the external driving power 3530 into the LED tube lamp 3500. For example, when the temperature detector detects the temperature of the current control circuit 3510 at 120° C., the current control circuit 3510 enters into the state of over temperature protection. Thereby, the current control circuit 3510 has both over temperature and over voltage protections.

In some embodiments, due to the external driving power, the length of the end caps are shortened. For ensuring the total length of the LED tube lamp to conform to a standard for a fluorescent lamp, a length of the lamp tube is lengthened to compensate the shortened length of the end caps. Due to the lengthened length of the lamp tube, the LED light string is correspondingly lengthened. Therefore, the interval of adjacent two LEDs disposed on the LED light string becomes greater under the same illuminance requirement. The greater interval increases the heat dissipation of the LEDs and so the operation temperature of the LEDs is lowered and the life-span of the LED tube lamp is extended.

Figure 37A:
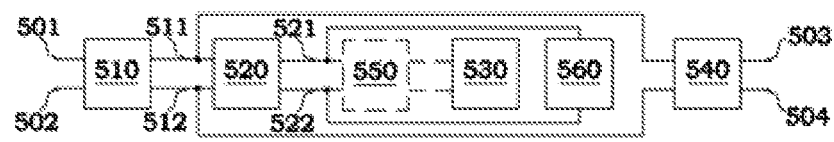
FIG. 37A is a block diagram of an LED lamp according to some embodiments.

FIG. 37A is a block diagram of an LED lamp according to an embodiment. Compared to FIG. 35A, the embodiment of FIG. 37A includes rectifying circuits 510 and 540, a filtering circuit 520, an LED lighting module 530, and an anti-flickering circuit 550, and further includes a protection circuit 560; wherein the power supply module may also include some components of an LED lighting module 530. Protection circuit 560 is coupled to filtering output terminals 521 and 522, to detect the filtered signal from filtering circuit 520 for determining whether to enter a protection state. Upon entering a protection state, protection circuit 560 works to limit, restrain, or clamp down on the level of the filtered signal, preventing damaging of components in LED lighting module 530. And rectifying circuit 540 and anti-flickering circuit 550 may be omitted, as depicted by the dotted line in FIG. 37A.

Figure 37B:
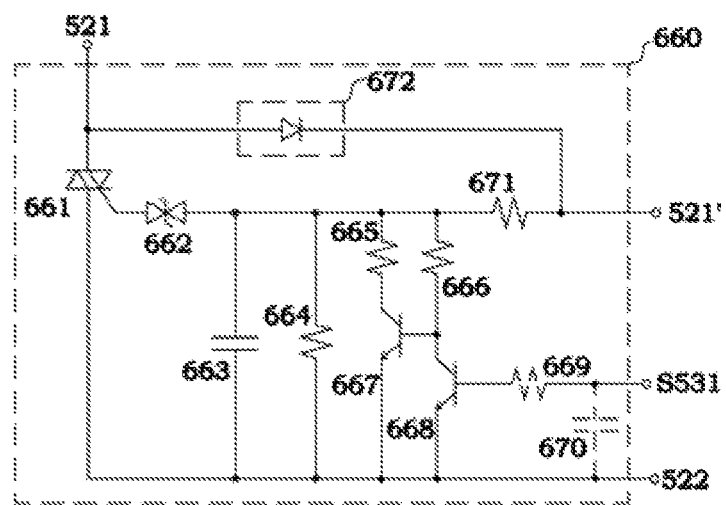
FIG. 37B is a schematic diagram of the protection circuit according to some embodiments.

FIG. 37B is a schematic diagram of the protection circuit according to an embodiment. Referring to FIG. 37B, a protection circuit 660 includes a voltage clamping circuit, a voltage division circuit, capacitors 663 and 670, resistor 669, and a diode 672, for entering a protection state when a current and/or voltage of the LED module is/are or might be excessively high, thereby preventing damaging of the LED module. The voltage clamping circuit includes a bidirectional triode thyristor (TRIAC) 661 and a DIAC or symmetrical trigger diode 662. The voltage division circuit includes bipolar junction transistors (BJT) 667 and 668 and resistors 664, 665, 666, and 671.

Bidirectional triode thyristor 661 has a first terminal connected to filtering output terminal 521, a second terminal connected to filtering output terminal 522, and a control terminal connected to a first terminal of symmetrical trigger diode 662, which has a second terminal connected to an end of capacitor 663, which has another end connected to filtering output terminal 522. Resistor 664 is in parallel to capacitor 663, and has an end connected to the second terminal of symmetrical trigger diode 662 and another end connected to filtering output terminal 522. Resistor 665 has an end connected to the second terminal of symmetrical trigger diode 662 and another end connected to the collector terminal of BJT 667, whose emitter terminal is connected to filtering output terminal 522. Resistor 666 has an end connected to the second terminal of symmetrical trigger diode 662 and another end connected to the collector terminal of BJT 668 and the base terminal of BJT 667. The emitter terminal of BJT 668 is connected to filtering output terminal 522. Resistor 669 has an end connected to the base terminal of BJT 668 and another end connected to an end of capacitor 670, which has another end connected to filtering output terminal 522. Resistor 671 has an end connected to the second terminal of symmetrical trigger diode 662 and another end connected to the cathode of diode 672, whose anode is connected to filtering output terminal 521.

It's worth noting that according to some embodiments, the resistance of resistor 665 should be smaller than that of resistor 666.

Next, an exemplary operation of protection circuit 660 in overcurrent protection is described as follows.

The node connecting resistor 669 and capacitor 670 is to receive a current detection signal S531, which represents the magnitude of current through the LED module. The other end of resistor 671 is a voltage terminal 521'. In this embodiment concerning overcurrent protection, voltage terminal 521' may be coupled to a biasing voltage source, or be connected through diode 672 to filtering output terminal 521, as shown in FIG. 37B, to take a filtered signal as a biasing voltage source. If voltage terminal 521' is coupled to an external biasing voltage source, diode 672 may be omitted, so it is depicted in a dotted line in FIG. 37B. The combination of resistor 669 and capacitor 670 can work to filter out high frequency components of the current detection signal S531, and then input the filtered current detection signal S531 to the base terminal of BJT 668 for controlling current conduction and cutoff of BJT 668. The filtering function of resistor 669 and capacitor 670 can prevent misoperation of BJT 668 due to noises. In practical use, resistor 669 and capacitor 670 may be omitted, so they are each depicted in a dotted line in FIG. 37B. When they are omitted, current detection signal S531 is input directly to the base terminal of BJT 668.

When the LED lamp is operating normally and the current of the LED module is within a normal range, BJT 668 is in a cutoff state, and resistor 66 works to pull up the base voltage of BJT 667, which therefore enters a conducting state. In this state, the electric potential at the second terminal of symmetrical trigger diode 662 is determined based on the voltage at voltage terminal 521' of the biasing voltage source and voltage division ratios between resistor 671 and parallel-connected resistors 664 and 665. Since the resistance of resistor 665 is relatively small, voltage share for resistor 665 is smaller and the electric potential at the second terminal of symmetrical trigger diode 662 is therefore pulled down. Then, the electric potential at the control terminal of bidirectional triode thyristor 661 is in turn pulled down by symmetrical trigger diode 662, causing bidirectional triode thyristor 661 to enter a cutoff state, which cutoff state makes protection circuit 660 not being in a protection state.

When the current of the LED module exceeds an overcurrent value, the level of current detection signal S531 will increase significantly to cause BJT 668 to enter a conducting state and then pull down the base voltage of BJT 667, which thereby enters a cutoff state. In this case, the electric potential at the second terminal of symmetrical trigger diode 662 is determined based on the voltage at voltage terminal 521' of the biasing voltage source and voltage division ratios between resistor 671 and parallel-connected resistors 664 and 666. Since the resistance of resistor 666 is relatively high, voltage share for resistor 666 is larger and the electric potential at the second terminal of symmetrical trigger diode 662 is therefore higher. Then the electric potential at the control terminal of bidirectional triode thyristor 661 is in turn pulled up by symmetrical trigger diode 662, causing bidirectional triode thyristor 661 to enter a conducting state, which conducting state works to restrain or clamp down on the voltage between filtering output terminals 521 and 522 and thus makes protection circuit 660 being in a protection state.

In this embodiment, the voltage at voltage terminal 521' of the biasing voltage source is determined based on the trigger voltage of bidirectional triode thyristor 661, and voltage division ratio between resistor 671 and parallel-connected resistors 664 and 665, or voltage division ratio between resistor 671 and parallel-connected resistors 664 and 666. Through voltage division between resistor 671 and parallel-connected resistors 664 and 665, the voltage from voltage terminal 521' at symmetrical trigger diode 662 will be lower than the trigger voltage of bidirectional triode thyristor 661. Otherwise, through voltage division between resistor 671 and parallel-connected resistors 664 and 666, the voltage from voltage terminal 521' at symmetrical trigger diode 662 will be higher than the trigger voltage of bidirectional triode thyristor 661. For example, in some embodiments, when the current of the LED module exceeds an overcurrent value, the voltage division circuit is adjusted to the voltage division ratio between resistor 671 and parallel-connected resistors 664 and 666, causing a higher portion of the voltage at voltage terminal 521' to result at symmetrical trigger diode 662, achieving a hysteresis function. Specifically, BJTs 667 and 668 as switches are respectively connected in series to resistors 665 and 666 which determine the voltage division ratios. The voltage division circuit is configured to control turning on which one of BJTs 667 and 668 and leaving the other off for determining the relevant voltage division ratio, according to whether the current of the LED module exceeds an overcurrent value. And the clamping circuit determines whether to restrain or clamp down on the voltage of the LED module according to the applying voltage division ratio.

Next, an exemplary operation of protection circuit 660 in overvoltage protection is described as follows.

The node connecting resistor 669 and capacitor 670 is to receive a current detection signal S531, which represents the magnitude of current through the LED module. As described above, protection circuit 660 still works to provide overcurrent protection. The other end of resistor 671 is a voltage terminal 521'. In this embodiment concerning overvoltage protection, voltage terminal 521' is coupled to the positive terminal of the LED module to detect the voltage of the LED module. Taking previously described embodiments for example, in embodiments of FIGS. 33A and 33B, LED lighting module 530 doesn't include driving circuit 1530, and the voltage terminal 521' would be coupled to filtering output terminal 521. Whereas in embodiments of FIG. 35B, LED lighting module 530 includes driving circuit 1530, and the voltage terminal 521' would be coupled to driving output terminal 1521. In this embodiment, voltage division ratios between resistor 671 and parallel-connected resistors 664 and 665, and voltage division ratios between resistor 671 and parallel-connected resistors 664 and 666 will be adjusted according to the voltage at voltage terminal 521', for example, the voltage at driving output terminal 1521 or filtering output terminal 521. Therefore, normal overcurrent protection can still be provided by protection circuit 660.

In some embodiments, when the LED lamp is operating normally, assuming overcurrent condition doesn't occur, the electric potential at the second terminal of symmetrical trigger diode 662 is determined based on the voltage at voltage terminal 521' and voltage division ratios between resistor 671 and parallel-connected resistors 664 and 665, and is insufficient to trigger bidirectional triode thyristor 661. Then bidirectional triode thyristor 661 is in a cutoff state, making protection circuit 660 not being in a protection state. On the other hand, when the LED module is operating abnormally with the voltage at the positive terminal of the LED module exceeding an overvoltage value, the electric potential at the second terminal of symmetrical trigger diode 662 is sufficiently high to trigger bidirectional triode thyristor 661 when the voltage at the first terminal of symmetrical trigger diode 662 is larger than the trigger voltage of bidirectional triode thyristor 661. Then bidirectional triode thyristor 661 enters a conducting state, making protection circuit 660 being in a protection state to restrain or clamp down on the level of the filtered signal.

As described above, protection circuit 660 provides one or two of the functions of overcurrent protection and overvoltage protection.

In some embodiments, protection circuit 660 may further include a zener diode connected to resistor 664 in parallel, which zener diode is used to limit or restrain the voltage across resistor 664. The breakdown voltage of the zener diode may be in the range of about 25~50 volts. In some embodiments, the breakdown voltage of the zener diode may be about 36 volts.

Further, a silicon controlled rectifier may be substituted for bidirectional triode thyristor 661, without negatively affecting the protection functions. Using a silicon controlled rectifier instead of a bidirectional triode thyristor 661 has a lower voltage drop across itself in conduction than that across bidirectional triode thyristor 661 in conduction.

In one embodiment, values of the parameters of protection circuit 660 may be set as follows. Resistance of resistor 669 may be about 10 ohms. Capacitance of capacitor 670 may be about 1 nF. Capacitance of capacitor 633 may be about 10 nF. The (breakover) voltage of symmetrical trigger diode 662 may be in the range of about 26~36 volts. Resistance of resistor 671 may be in the range of about 300 k~600 k ohms. In some embodiments, resistance of resistor 671 may be about 540 k ohms. Resistance of resistor 666 may be in the range of about 100 k~300 k ohms. In some embodiments, resistance of resistor 666 may be about 220 k ohms. Resistance of resistor 665 may be in the range of about 30 k~100 k ohms. In some embodiments, resistance of resistor 665 may be about 40 k ohms. Resistance of resistor 664 is in some embodiments in the range of about 100 k~300 k ohms, and may preferably be, in some embodiments about 220 k ohms.

Having described at least one of the exemplary embodiments with reference to the accompanying drawings, it will be apparent to those of skill in the art that the concepts are not limited to those precise embodiments, and that various modifications and variations can be made in the presently disclosed system without departing from the scope or spirit of the disclosure. Thus, it is intended that the present disclosure cover modifications and variations of this disclosure provided they come within the scope of the appended claims and their equivalents. Specifically, one or more limitations recited throughout the specification can be combined in any level of details to the extent they are described to improve the LED tube lamp. These limitations include, but are not limited to: light transmissive portion and reinforcing portion; platform and bracing structure; vertical rib, horizontal rib and curvilinear rib; thermally conductive plastic and light transmissive plastic; silicone-based matrix having good thermal conductivity; anti-reflection layer; roughened surface; electrically conductive wiring layer; wiring protection layer; ridge; maintaining stick; and shock-preventing safety switch.

What is claimed is:

1. An LED tube lamp, comprising:
a lamp tube comprising a light transmissive portion and a reinforcing portion;
a light strip disposed inside the lamp tube and on the reinforcing portion;
a plurality of LED light sources mounted on the light strip; and
a power supply module comprising a plurality of electronic components configured to drive the LED light sources,
wherein, at least one of the plurality of electronic components is disposed on the reinforcing portion,
wherein, a rectifying circuit, a filtering circuit and an over voltage protection circuit are formed by interconnecting the plurality of electronic components,
wherein the filtering circuit is coupled to the rectifying circuit and is configured to receive a rectified signal from the rectifying circuit, and
wherein the over voltage protection circuit is coupled to the filtering circuit for detecting a filtered signal, and the over voltage protection circuit is configured to clamp the filtered signal when determining that the filtered signal is higher than a predefined over voltage protection value.

2. The LED tube lamp of claim 1, wherein the over voltage protection circuit comprises a voltage stabilization circuit.

3. The LED tube lamp of claim 2, wherein the voltage stabilization circuit comprises a zener diode.

4. The LED tube lamp of claim 1, wherein the over voltage protection circuit is configured such that, in a protection state, the over voltage protection circuit limits or restrains a level of the filtered signal.

5. The LED tube lamp of claim 1, wherein the filtering circuit has a first filtering output terminal and a second filtering output terminal; the over voltage protection circuit includes a voltage clamping circuit comprising a thyristor, wherein the thyristor has a first terminal coupled to the first filtering output terminal and a second terminal coupled to the second filtering output terminal; and the thyristor is configured such that when an overvoltage condition of the plurality of LED light sources occurs the thyristor enters a conducting state, causing the voltage between the first filtering output terminal and the second filtering output terminal to be restrained or clamped down on.

6. The LED tube lamp of claim 5, wherein the over voltage protection circuit includes a capacitor, and the voltage clamping circuit further includes a symmetrical trigger diode; the thyristor has a control terminal connected to a first terminal of the symmetrical trigger diode; the symmetrical trigger diode has a second terminal connected to an end of the capacitor, which has another end connected to the second filtering output terminal; and when the overvoltage condition of the plurality of LED light sources occurs, the thyristor enters the conducting state by an electric potential at the second terminal of the symmetrical trigger diode.

7. The LED tube lamp of claim 6, wherein the over voltage protection circuit further includes a voltage division circuit coupled to the symmetrical trigger diode and the filtering circuit; the voltage division circuit is also coupled to detect a voltage of the plurality of LED light sources; and when an overvoltage condition of the plurality of LED light sources occurs, the voltage division circuit causes the thyristor to enter the conducting state by an electric potential at the second terminal of the symmetrical trigger diode.

8. The LED tube lamp of claim 7, wherein the voltage division circuit comprises a first electronic switch, a second electronic switch, a first resistor, a second resistor, a third resistor, and a fourth resistor, wherein the third resistor has an end connected to the second terminal of the symmetrical trigger diode and another end connected to the second filtering output terminal; the first resistor has an end connected to the second terminal of the symmetrical trigger diode and another end connected to the first electronic switch, which is connected to the second filtering output terminal; the second resistor has an end connected to the second terminal of the symmetrical trigger diode and another end connected to the second electronic switch and first electronic switch; the second electronic switch is connected to the second filtering output terminal; and the fourth resistor has an end connected to the second terminal of the symmetrical trigger diode and another end connected to a positive terminal of the plurality of LED light sources.

9. The LED tube lamp of claim 8, wherein the resistance of the first resistor is smaller than that of the second resistor, and when the voltage at the positive terminal of the plurality of LED light sources exceeds an overvoltage value, the second electronic switch enters a conducting state and the first electronic switch enters a cutoff state, causing the thyristor to enter a conducting state by an electric potential at the second terminal of the symmetrical trigger diode, thus causing the over voltage protection circuit to be in a protection state to restrain or clamp down on a level of the filtered signal or the voltage between the first filtering output terminal and the second filtering output terminal.

10. The LED tube lamp of claim 5, wherein the thyristor comprises a bidirectional triode thyristor or a silicon controlled rectifier.

11. An LED tube lamp, comprising:
a lamp tube comprising a light transmissive portion and a reinforcing portion;
a light strip disposed inside the lamp tube and on the reinforcing portion;
a plurality of LED light sources mounted on the light strip; and
a power supply module comprising a plurality of electronic components configured to drive the LED light sources,
wherein, at least one of the plurality of electronic components is disposed on the reinforcing portion and at least one of the plurality of electronic components is disposed on the light strip,
wherein, a rectifying circuit, a filtering circuit and an over voltage protection circuit are formed by interconnecting the plurality of electronic components, the filtering circuit is coupled to the rectifying circuit and is configured to receive a rectified signal from the rectifying circuit, the over voltage protection circuit coupled to the filtering circuit for detecting a filtered signal, the over voltage protection circuit configured to clamp the filtered signal when determining that the filtered signal is higher than a predefined over voltage protection value.

12. The LED tube lamp of claim 11, wherein the over voltage protection circuit comprises a voltage stabilization circuit.

13. The LED tube lamp of claim 12, wherein the voltage stabilization circuit comprises a zener diode.

14. The LED tube lamp of claim 11, further comprising a first end cap attached to a first end of the lamp tube and a second end cap attached to a second end of the lamp tube, wherein at least one of the plurality of electronic components is disposed in one of first end cap and the second end cap.

15. The LED tube lamp of claim 11, wherein the over voltage protection circuit is configured such that, in a protection state, the over voltage protection circuit limits or restrains a level of the filtered signal.

16. The LED tube lamp of claim 11, wherein the filtering circuit has a first filtering output terminal and a second filtering output terminal; the over voltage protection circuit includes a voltage clamping circuit comprising a thyristor, wherein the thyristor has a first terminal coupled to the first filtering output terminal and a second terminal coupled to the second filtering output terminal; and the thyristor is configured such that when a overvoltage condition of the plurality of LED light sources occurs the thyristor enters a conducting state, causing the voltage between the first filtering output terminal and the second filtering output terminal to be restrained or clamped down on.

17. The LED tube lamp of claim 16, wherein the over voltage protection circuit includes a capacitor, and the voltage clamping circuit further includes a symmetrical trigger diode; the thyristor has a control terminal connected to a first terminal of the symmetrical trigger diode; the symmetrical trigger diode has a second terminal connected to an end of the capacitor, which has another end connected to the second filtering output terminal; and when an overvoltage condition of the plurality of LED light sources occurs, the thyristor enters the conducting state by an electric potential at the second terminal of the symmetrical trigger diode.

18. The LED tube lamp of claim 17, wherein the over voltage protection circuit further includes a voltage division circuit coupled to the symmetrical trigger diode and the filtering circuit; the voltage division circuit is also coupled to detect a voltage of the plurality of LED light sources; and when an overvoltage condition of the plurality of LED light sources occurs, the voltage division circuit causes the thyristor to enter the conducting state by an electric potential at the second terminal of the symmetrical trigger diode.

19. The LED tube lamp of claim 16, wherein the thyristor comprises a bidirectional triode thyristor or a silicon controlled rectifier.

20. An LED tube lamp, comprising:
a lamp tube comprising a light transmissive portion and a reinforcing portion;
a light strip disposed inside the lamp tube and on the reinforcing portion;
a plurality of LED light sources mounted on the light strip; and
a power supply module comprising a plurality of electronic components configured to drive the LED light sources,
wherein, the plurality of electronic components are disposed on the light strip and the reinforcing portion,
wherein a rectifying circuit, a filtering circuit and an over voltage protection circuit are formed by interconnecting the plurality of electronic components, wherein the filtering circuit is coupled to the rectifying circuit and is configured to receive a rectified signal from the rectifying circuit, and
wherein the over voltage protection circuit is coupled to the filtering circuit for detecting a filtered signal, the over voltage protection circuit is configured to clamp the filtered signal when determining that the filtered signal is higher than a predefined over voltage protection value.

21. The LED tube lamp of claim 20, wherein the over voltage protection circuit comprises a voltage stabilization circuit.

22. The LED tube lamp of claim 21, wherein the voltage stabilization circuit comprises a zener diode.

23. The LED tube lamp of claim 20, wherein the over voltage protection circuit is configured such that, in a protection state, the over voltage protection circuit limits or restrains a level of the filtered signal.

24. The LED tube lamp of claim 20, wherein the filtering circuit has a first filtering output terminal and a second filtering output terminal; the over voltage protection circuit includes a voltage clamping circuit comprising a thyristor, wherein the thyristor has a first terminal coupled to the first filtering output terminal and a second terminal coupled to the second filtering output terminal; and the thyristor is configured such that when an overvoltage condition of the plurality of LED light sources occurs the thyristor enters a conducting state, causing the voltage between the first filtering output terminal and the second filtering output terminal to be restrained or clamped down on.

25. The LED tube lamp of claim 24, wherein the over voltage protection circuit includes a capacitor, and the voltage clamping circuit further includes a symmetrical trigger diode; the thyristor has a control terminal connected to a first terminal of the symmetrical trigger diode; the symmetrical trigger diode has a second terminal connected to an end of the capacitor, which has another end connected to the second filtering output terminal; and when a overvoltage condition of the plurality of LED light sources occurs, the thyristor enters the conducting state by an electric potential at the second terminal of the symmetrical trigger diode.

26. The LED tube lamp of claim 25, wherein the over voltage protection circuit further includes a voltage division circuit coupled to the symmetrical trigger diode and the filtering circuit; the voltage division circuit is also coupled to detect a voltage of the plurality of LED light sources; and when a overvoltage condition of the plurality of LED light sources occurs, the voltage division circuit causes the thyristor to enter the conducting state by an electric potential at the second terminal of the symmetrical trigger diode.

27. The LED tube lamp of claim 24, wherein the thyristor comprises a bidirectional triode thyristor or a silicon controlled rectifier.

* * * * *